United States Patent
Strayer et al.

(10) Patent No.: US 11,831,657 B2
(45) Date of Patent: Nov. 28, 2023

(54) TRUST POLICIES FOR A DATA PROVISIONING LAYER

(71) Applicant: Raytheon BBN Technologies Corp., Cambridge, MA (US)

(72) Inventors: William Timothy Strayer, West Newton, MA (US); Brandon Doherty Kalashian, Waltham, MA (US); Michael Hassan Atighetchi, Framingham, MA (US); Stephane Yannick Blais, Framingham, MA (US); Samuel Cunningham Nelson, Sudbury, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 157 days.

(21) Appl. No.: 17/548,068

(22) Filed: Dec. 10, 2021

(65) Prior Publication Data

US 2022/0103572 A1 Mar. 31, 2022

Related U.S. Application Data

(63) Continuation-in-part of application No. 16/832,039, filed on Mar. 27, 2020, now Pat. No. 11,233,707.

(51) Int. Cl.
*H04L 29/06* (2006.01)
*H04L 9/40* (2022.01)

(52) U.S. Cl.
CPC .......... *H04L 63/126* (2013.01); *H04L 63/123* (2013.01); *H04L 63/1408* (2013.01)

(58) Field of Classification Search
None
See application file for complete search history.

(56) References Cited

U.S. PATENT DOCUMENTS 8,898,452 B2 11/2014 Plotkin et al.
9,130,868 B2 9/2015 Kim et al.
(Continued)

FOREIGN PATENT DOCUMENTS

CN 201980084017 A 7/2021
DE 102014008059 A1 12/2015
(Continued)

OTHER PUBLICATIONS

"Attribute Based Encryption for Attribute Based Access Control," ETSI, Technical Specification TS 103 532, 2018.
(Continued)

*Primary Examiner* — Benjamin E Lanier
(74) *Attorney, Agent, or Firm* — Lando & Anastasi, LLP

(57) ABSTRACT

Techniques for enforcing trust policies for payload data transmitted through a data provisioning layer include: receiving, by a node in the data provisioning layer, payload data to be delivered to a recipient; obtaining, by the node, a trust policy indicating multiple attributes used to determine trustworthiness of payloads; determining, by the node, a set of values of the attributes associated with the payload data; generating, by the node, a trustworthiness opinion based at least on the trust policy and the set of values of the attributes; transmitting, by the node, the payload data and the trustworthiness opinion via the data provisioning layer toward the recipient; computing, by the recipient, a trustworthiness metric associated with the payload data based at least on the trustworthiness opinion; and determining, by the recipient, an action to take with respect to the payload data based at least on the trustworthiness metric.

16 Claims, 12 Drawing Sheets

(56) References Cited

U.S. PATENT DOCUMENTS

| | | | |
|---|---|---|---|
| 9,223,849 B1* | 12/2015 | Bilinski | G06Q 10/06393 |
| 9,560,011 B2 | 1/2017 | Pal et al. | |
| 9,917,847 B2 | 3/2018 | Kacin et al. | |
| 9,954,832 B2 | 4/2018 | Pollet et al. | |
| 10,110,635 B1* | 10/2018 | Hussain | G06F 21/53 |
| 10,367,811 B2 | 7/2019 | Clark et al. | |
| 2004/0243580 A1 | 12/2004 | Markki et al. | |
| 2006/0168270 A1 | 7/2006 | Townsley et al. | |
| 2007/0208937 A1 | 9/2007 | Cam-Winget et al. | |
| 2009/0144499 A1 | 6/2009 | Nicholson et al. | |
| 2010/0287204 A1 | 11/2010 | Amini et al. | |
| 2011/0145993 A1 | 6/2011 | Rader et al. | |
| 2013/0297752 A1 | 11/2013 | Bhanujan et al. | |
| 2014/0215080 A1 | 7/2014 | Alabiso et al. | |
| 2014/0307538 A1 | 10/2014 | Iovanna et al. | |
| 2015/0040218 A1* | 2/2015 | Alperovitch | H04L 51/212 |
| | | | 382/209 |
| 2017/0155737 A1 | 6/2017 | Jannink et al. | |
| 2017/0295090 A1 | 10/2017 | Gopalan et al. | |
| 2018/0039524 A1 | 2/2018 | Dettori et al. | |
| 2018/0063178 A1* | 3/2018 | Jadhav | H04L 63/1433 |
| 2018/0076930 A1 | 3/2018 | Buchali et al. | |
| 2018/0309779 A1 | 10/2018 | Benyo et al. | |
| 2018/0309794 A1 | 10/2018 | Eskridge et al. | |
| 2019/0036778 A1 | 1/2019 | Bathen et al. | |
| 2019/0104086 A1 | 4/2019 | Pope et al. | |
| 2019/0109713 A1 | 4/2019 | Clark et al. | |
| 2019/0173854 A1 | 6/2019 | Beck | |
| 2020/0183766 A1 | 6/2020 | Kumar-Mayernik et al. | |
| 2020/0186507 A1 | 6/2020 | Dhanabalan et al. | |
| 2020/0210427 A1 | 7/2020 | Dugan et al. | |
| 2020/0250008 A1 | 8/2020 | Cleave et al. | |
| 2020/0302449 A1 | 9/2020 | Wagner et al. | |
| 2020/0310394 A1 | 10/2020 | Wouhaybi et al. | |
| 2021/0306227 A1 | 9/2021 | Atighetchi et al. | |

FOREIGN PATENT DOCUMENTS

| | | |
|---|---|---|
| EP | 3695339 A1 | 8/2020 |
| JP | 5639660 B2 | 12/2014 |
| JP | 2018-521534 A | 8/2018 |
| WO | 2007142952 A2 | 12/2007 |
| WO | 2020036239 A1 | 2/2020 |

OTHER PUBLICATIONS

"Battlefield Airborne Communications Node (BACN)," Capabilities p. 2019.

"Boeing Completes Design Review for U.S. Air Force's Talon HATE Program," Boeing News Release, 2014.

"Content-Based Mobile Edge Networking (CBMEN)," DARPA Program Information, 2020.

"Open Mission Systems (OMS)," U.S. Air Force Virtual Distributed Laboratory, 2020.

Akhuseyinoglu, N.B. et al., "On Automated Trust Computation in IoT with Multiple Attributes and Subjective Logic," 2020 IEEE 45th Conference on Local Computer Networks (LCN), (2020), pp. 267-278.

ANDS, "Data Provenance," (2018).

Atighetchi, M. et al., "Adaptive Use of Network-Centric Mechanisms in Cyber-Defense," Second IEEE International Symposium on Network Computing and Applications (NCA'03), (2003).

Atighetchi, M. et al., "Transparent Insertion of Custom Logic in HTTP(S) Streams Using PbProxy," IEEE Internet Computing, Distributed System Middleware, (2011), pp. 43-50.

Barreto, P.S.L.M., et al. "Efficient and Provably-Secure Identity-Based Signatures and Signcryption from Bilinear Maps," Proceedings of the 11th International Conference on Theory and Application of Cryptology and Information Security, 2005, pp. 515-532.

Butler, A. "5th-To-4th Gen Fighter Comms Competition Eyed In Fiscal 2015," Aviation Week & Space Technology, 2014.

Butler, M. "The Developer's Guide to Cursor on Target," MITRE, 2005.

Cardellini, V. et al., "A Decentralized Approach to Network-Aware Service Composition," IFIP International Federation for Information Processing, (2015), pp. 34-48.

Chen, I. et al., "Trust Management for SOA-Based IoT and Its Application to Service Composition," IEEE Transactions on Services Computing, vol. 9, No. 3, (2016), pp. 482-495.

D'Andria, F. et al., "Data Movement in the Internet of Things Domain," IFIP International Federation of Information Processing, (2015), pp. 243-252.

Datacite.org, "Tracking metadata provenance," (2019).

Evans, J. B. "Dynamic Network Adaptation for Mission Optimization (DyNAMO)," DARPA Program Information, 2019.

Grooten, P. et al., "Next Generation Data Management Architecture in Statistical Organisation," (2017).

Hess, F. "Efficient Identity Based Signature Schemes Based on Pairings," Revised Papers from the 9th Annual International Workshop on Selected Areas in Cryptography, 2003, pp. 310-324.

Jacobson, V., et al. "Networking Named Content," Proceedings of the 5th International Conference on Emerging Networking Experiments and Technologies, 2009, pp. 1-12.

Joint Task Force Transformation Initiative. "Security and Privacy Controls for Federal Information Systems and Organizations," NIST Special Publication, vol. 800, No. 53, 2013, pp. 8-13.

Jones, J. "System of Systems Integration Technology and Experimentation (SoSITE)," DARPA Program Information, 2019.

Khoury, J., et al. "An Efficient and Expressive Access Control Architecture for Content-Based Networks," 2014 IEEE Military Communications Conference, 2014, pp. 1034-1039.

Kiser, A., et al. "The Combat Cloud," Research Report Submitted to the Faculty of Air Command and Staff College (ACSC), 2017.

Lebo, T., et al. "PROV-O: The PROV Ontology," W3C, W3C Recommendation, vol. 30, 2013.

Malenic, M. "Jetpack Enables Comms Between F-22/35 and Legacy Aircraft," F-16.net, 2014.

Olteanu, A.C. et al., "Enabling Mobile Devices for Home Automation Using ZigBee," 19th International Conference on Control Sysytems and Computer Science, IEEE, (2013), pp. 189-195.

Prud'hommeaux, E. and Seaborne A. "SPARQL Query Language for RDF," W3C, W3C Recommendation, 2008.

Roberts, R. et al., "Weight approximations in multi-attribute decision models," Journal of Multi-Criteria Decision Analysis, vol. 11, No. 6, (2002), pp. 291-303.

Skoric, B. et al., "Flow-based reputation with uncertainty: evidence-based subjective logic," International Journal of Information Security, vol. 15, No. 4, (2016), pp. 381-402.

Strayer, T., et al. "CASCADE: Content Access System for the Combat-Agile Distributed Environment," IEEE MILCOM, 2013, pp. 1518-1523.

Strayer, T., et al. "Mission-Centric Content Sharing Across Heterogeneous Networks," 2019 International Conference on Computing, Networking and Communications (ICNC), 2019, pp. 1034-1038.

Truong, N. B. et al., "A reputation and knowledge based trust service platform for trustworthy social internet of things," Innovations in Clouds, Internet and Networks (ICIN), Paris, France, (2016), pp. 104-111.

W3C, "Provenance, Metadata, and Trust," (2021).

W3C, "What Is Provenance," (2021).

Wood, D. et al. "RDF 1.1 Concepts and Abstract Syntax," W3C, W3C Recommendation, 2014.

Xylomenos, G., et al. "A Survey of Information-Centric Networking Research," in IEEE Communications Surveys & Tutorials, vol. 16, No. 2, 2014, pp. 1024-1049.

Zhang, L., et al. "Named Data Networking," ACM SIGCOMM Computer Communication Review, vol. 44, No. 3, 2014, pp. 66-73.

Zhang, Z., et al. "Security Support in Named Data Networking," Technical Report, 2018.

* cited by examiner

TRUST POLICIES FOR A DATA PROVISIONING LAYER

RELATED APPLICATIONS

This application claims priority under 35 U.S.C. § 120 as a Continuation-in-Part of U.S. patent application Ser. No. 16/832,039, titled "METADATA-BASED INFORMATION PROVENANCE," filed Mar. 27, 2020, which is hereby incorporated by reference. The Applicant hereby rescinds any disclaimer of claim scope in the parent application(s) or the prosecution history thereof and advises the USPTO that the claims in this application may be broader than any claim in the parent application(s).

STATEMENT REGARDING FEDERALLY-SPONSORED RESEARCH OR DEVELOPMENT

This application was made with government support under Contract No. FA8750-19-C-0535 awarded by the Air Force Research Laboratory (AFRL). The U.S. Government has certain rights in this invention.

BACKGROUND

When transmitting data over a network, the timeliness and accuracy of the transmission are typically important considerations. Various techniques also exist to help ensure that data is transmitted securely and to the intended recipient. However, a recipient (a.k.a. "consumer") of the data is not always able to confirm that the data received is trustworthy, or determine the path that the data followed in transit from the producer to the consumer. If data is not trustworthy, the recipient may not be able to rely on the data to make important decisions (e.g., targeting decisions in combat situations at the tactical edge, business decisions, medical decisions, and/or other kinds of decisions that depend on the trustworthiness of private, sensitive, or otherwise mission-critical data).

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to information provenance in networked computer systems.

SUMMARY

One or more embodiments include techniques for enforcing trust policies for payload data transmitted through a data provisioning layer.

In general, in one aspect, one or more non-transitory computer-readable media store instructions that, when executed by one or more processors, cause the one or more processors to perform operations including: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; transmitting, by the first node, the payload data and the first trustworthiness opinion via the data provisioning layer toward the recipient; computing, by the recipient, a trustworthiness metric associated with the payload data based at least on the first trustworthiness opinion; and determining, by the recipient, an action to take with respect to the payload data based at least on the trustworthiness metric.

The operations may further include: receiving, by the first node, a second trustworthiness opinion associated with the payload data. Generating the first trustworthiness opinion may be further based on the second trustworthiness opinion.

The operations may further include transforming, by the node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, a system includes one or more devices including one or more processors and one or more non-transitory computer-readable media including instructions that, when executed by the one or more processors, cause the one or more processors to perform operations including: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; transmitting, by the first node, the payload data and the first trustworthiness opinion via the data provisioning layer toward the recipient; computing, by the recipient, a trustworthiness metric associated with the payload data based at least on the first trustworthiness opinion; and determining, by the recipient, an action to take with respect to the payload data based at least on the trustworthiness metric.

The operations may further include: receiving, by the first node, a second trustworthiness opinion associated with the payload data. Generating the first trustworthiness opinion may be further based on the second trustworthiness opinion.

The operations may further include transforming, by the node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, a method includes: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; transmitting, by the first node, the payload data and the first trustworthiness opinion via the data provisioning layer toward the recipient; computing, by the recipient, a trustworthiness metric associated with the payload data based at least on the first trustworthiness opinion; and determining, by the recipient, an action to take with respect to the payload data based at least on the trustworthiness metric.

The method may further include: receiving, by the first node, a second trustworthiness opinion associated with the payload data. Generating the first trustworthiness opinion may be further based on the second trustworthiness opinion.

The method may further include transforming, by the node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, one or more non-transitory computer-readable media store instructions that, when executed by one or more processors, cause the one or more processors to perform operations including: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; and transmitting, by the first node, the payload data and the first trustworthiness opinion via the data provisioning layer toward the recipient.

The operations may further include: receiving, by a second node in the data provisioning layer from the first node, the payload data and the first trustworthiness opinion; obtaining, by the second node, the trust policy indicating the multiple attributes used to determine trustworthiness of payloads; determining, by the second node, a second set of values of the attributes associated with the payload data; generating, by the second node, a second trustworthiness opinion based at least on the trust policy and the second set of values of the attributes; and transmitting, by the second node, the payload data and the second trustworthiness opinion via the data provisioning layer toward the recipient. Computing the second trustworthiness opinion may be further based on the first trustworthiness opinion.

The operations may further include transforming, by the first node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The first trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, a system includes one or more devices including one or more processors and one or more non-transitory computer-readable media including instructions that, when executed by the one or more processors, cause the one or more processors to perform operations including: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; and transmitting, by the first node, the payload data and the first trustworthiness opinion via the data provisioning layer toward the recipient.

The operations may further include: receiving, by a second node in the data provisioning layer from the first node, the payload data and the first trustworthiness opinion; obtaining, by the second node, the trust policy indicating the multiple attributes used to determine trustworthiness of payloads; determining, by the second node, a second set of values of the attributes associated with the payload data; generating, by the second node, a second trustworthiness opinion based at least on the trust policy and the second set of values of the attributes; and transmitting, by the second node, the payload data and the second trustworthiness opinion via the data provisioning layer toward the recipient.

Computing the second trustworthiness opinion may be further based on the first trustworthiness opinion.

The operations may further include transforming, by the first node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The first trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, a method includes: receiving, by a first node in a data provisioning layer, payload data to be delivered to a recipient; obtaining, by the first node, a trust policy indicating multiple attributes used to determine trustworthiness of payloads; determining, by the first node, a first set of values of the attributes associated with the payload data; generating, by the first node, a first trustworthiness opinion based at least on the trust policy and the first set of values of the attributes; and transmitting, by the first node, the payload data and the first trustworthiness opinion via the data provisioning layer toward the recipient.

The method may further include: receiving, by a second node in the data provisioning layer from the first node, the payload data and the first trustworthiness opinion; obtaining, by the second node, the trust policy indicating the multiple attributes used to determine trustworthiness of payloads; determining, by the second node, a second set of values of the attributes associated with the payload data; generating, by the second node, a second trustworthiness opinion based at least on the trust policy and the second set of values of the attributes; and transmitting, by the second node, the payload data and the second trustworthiness opinion via the data provisioning layer toward the recipient. Computing the second trustworthiness opinion may be further based on the first trustworthiness opinion.

The method may further include transforming, by the first node, the payload data before transmitting the payload data toward the recipient.

The payload data may originate from a sensor, and generating the first trustworthiness opinion may include analyzing a time series of the payload data to determine heuristically whether the payload data originating from the sensor is practically reasonable.

The first trustworthiness opinion may include at least a belief metric, a disbelief metric, and an uncertainty metric.

The trust policy may include multiple weights indicating relative importance of respective attributes in the multiple attributes.

The attributes used to determine trustworthiness of payloads may include one or more of a source node identifier, a redaction flag indicating whether the payload data has been redacted, or a translation flag indicating whether the payload data has been translated from one format to another format.

The attributes used to determine trustworthiness of payloads may include at least one attribute that is directly observable by the first node and at least one attribute that is referred by another node in the data provisioning layer.

In general, in one aspect, one or more non-transitory computer-readable media store instructions that, when executed by one or more processors, cause the one or more processors to perform operations including: receiving, by a recipient in a data provisioning layer, payload data and a trustworthiness opinion associated with the payload data; obtaining, by the recipient, a trust policy used to determine trustworthiness of payloads; computing, by the recipient, a trustworthiness metric associated with the payload data based at least on the trust policy and the trustworthiness opinion; and determining, by the recipient, an action to take with respect to the payload data based at least on the trustworthiness metric.

The trustworthiness opinion may include at least a belief metric, a disbelief metric, and an uncertainty metric.

The trust policy may include multiple weights indicating relative importance of respective attributes associated with the payload data.

In general, in one aspect, a system includes one or more devices including one or more processors and one or more non-transitory computer-readable media including instructions that, when executed by the one or more processors, cause the one or more processors to perform operations including: receiving, by a recipient in a data provisioning layer, payload data and a trustworthiness opinion associated with the payload data; obtaining, by the recipient, a trust policy used to determine trustworthiness of payloads; computing, by the recipient, a trustworthiness metric associated with the payload data based at least on the trust policy and the trustworthiness opinion; and determining, by the recipient, an action to take with respect to the payload data based at least on the trustworthiness metric.

The trustworthiness opinion may include at least a belief metric, a disbelief metric, and an uncertainty metric.

The trust policy may include multiple weights indicating relative importance of respective attributes associated with the payload data.

In general, in one aspect, a method includes: receiving, by a recipient in a data provisioning layer, payload data and a trustworthiness opinion associated with the payload data; obtaining, by the recipient, a trust policy used to determine trustworthiness of payloads; computing, by the recipient, a trustworthiness metric associated with the payload data based at least on the trust policy and the trustworthiness opinion; and determining, by the recipient, an action to take with respect to the payload data based at least on the trustworthiness metric.

The trustworthiness opinion may include at least a belief metric, a disbelief metric, and an uncertainty metric.

The trust policy may include multiple weights indicating relative importance of respective attributes associated with the payload data.

One or more embodiments provide robust provenance trails for payload data, by generating provenance metadata in a data provisioning layer that manages dissemination of the payload data. Provenance trails may describe, for example, data origins and operations performed by intermediate nodes. In addition, one or more embodiments assess the trustworthiness of payload data, based on provenance metadata. Thus, one or more embodiments help ensure that authoritative data sources are used and that the payload data supplied by those sources is trustworthy.

Provenance information and trustworthiness computations, based on provenance metadata as described herein, may be useful in many different contexts. For example, in combat situations, provenance information and trustworthiness computations may allow for mission-critical decisions based on trusted information. Provenance information and trustworthiness computations may also be useful in non-combat situations, such as business or medical settings dealing with the transmission of trade secrets, personally identifiable information, and/or other kinds of private and/or sensitive data. Provenance information may provide insights such as who originally produced the payload data, how the payload data was shaped or otherwise transformed in transit, and/or what path the payload data followed in transit.

In general, in one aspect, one or more non-transitory machine-readable media store instructions that, when executed by one or more processors, cause: a first node in a data provisioning layer receiving encrypted payload data to be delivered to a recipient; the first node generating first provenance metadata that describes at least one action taken by the first node with respect to the encrypted payload data; and the first node transmitting the encrypted payload data and the first provenance metadata via the data provisioning layer toward the recipient. The at least one action taken by the first node with respect to the encrypted payload data may include one or more of receiving the encrypted payload data and/or transforming decrypted contents of the encrypted payload data. The first node may not be authorized to decrypt the encrypted payload data, and generating the first provenance metadata may be performed without decrypting the encrypted payload data. The recipient may be physically located at a tactical edge of a military mission.

The one or more non-transitory machine-readable media may further store instructions that, when executed by one or more processors, cause: a second node in the data provisioning layer receiving the encrypted payload data and the first provenance metadata; and based at least on the first provenance metadata, the second node computing a trustworthiness metric associated with the encrypted payload data. Computing the trustworthiness metric may include applying at least one user-configurable trustworthiness rule to the first provenance metadata.

The one or more non-transitory machine-readable media may further store instructions that, when executed by one or more processors, cause: the first node encrypting the first provenance metadata, using a first encryption policy that is different from a second encryption policy used to encrypt the encrypted payload data.

The one or more non-transitory machine-readable media may further store instructions that, when executed by one or more processors, cause: receiving user input that defines at least part of a provenance metadata policy; and responsive to receiving the user input, configuring multiple nodes in the data provisioning layer to generate provenance metadata according to the provenance metadata policy.

The one or more non-transitory machine-readable media may further store instructions that, when executed by one or more processors, cause: aggregating the first provenance data with a set of provenance metadata associated with multiple payload transmissions; and based at least on the set of provenance metadata, generating a visual representation of one or more provenance paths through the data provisioning layer.

In general, in one aspect, a system includes: a data provisioning layer; and a first node in the data provisioning layer. The node is configured to perform operations including: receiving encrypted payload data to be delivered to a recipient, generating first provenance metadata that describes at least one action taken by the first node with respect to the encrypted payload data, and transmitting the encrypted payload data and the first provenance metadata via the data provisioning layer toward the recipient. The system may further include a second node in the data provisioning layer, configured to perform operations including: receiving the encrypted payload data and the first provenance metadata, and based at least on the first provenance metadata, computing a trustworthiness metric associated with the encrypted payload data.

In general, in one aspect, a method includes: a first node in a data provisioning layer receiving encrypted payload data to be delivered to a recipient; the first node generating first provenance metadata that describes at least one action taken by the first node with respect to the encrypted payload data; and the first node transmitting the encrypted payload data and the first provenance metadata via the data provisioning layer toward the recipient. The at least one action taken by the first node with respect to the encrypted payload data may include one or more of receiving the encrypted payload data and/or transforming decrypted contents of the encrypted payload data.

The method may further include: a second node in the data provisioning layer receiving the encrypted payload data and the first provenance metadata; and based at least on the first provenance metadata, the second node computing a trustworthiness metric associated with the encrypted payload data. Computing the trustworthiness metric may include applying at least one user-configurable trustworthiness rule to the first provenance metadata. The first node may not be authorized to decrypt the encrypted payload data, and generating the first provenance metadata may be performed without decrypting the encrypted payload data. The recipient may be physically located at a tactical edge of a military mission.

The method may further include: the first node encrypting the first provenance metadata, using a first encryption policy that is different from a second encryption policy used to encrypt the encrypted payload data.

The method may further include: receiving user input that defines at least part of a provenance metadata policy; and responsive to receiving the user input, configuring multiple nodes in the data provisioning layer to generate provenance metadata according to the provenance metadata policy.

The method may further include: aggregating the first provenance data with a set of provenance metadata associated with multiple payload transmissions; and based at least on the set of provenance metadata, generating a visual representation of one or more provenance paths through the data provisioning layer.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral.

For the purposes of clarity, some components may not be labeled in every figure. In the Figures.

DETAILED DESCRIPTION

Figure 1A:
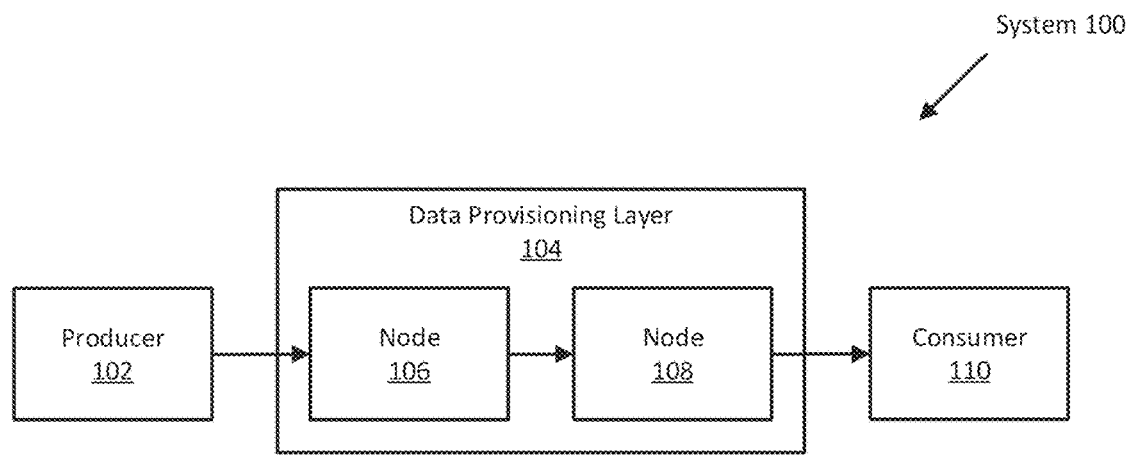
FIGS. 1A-1B are block diagrams of an example of a system according to an embodiment.
Figure 1B:
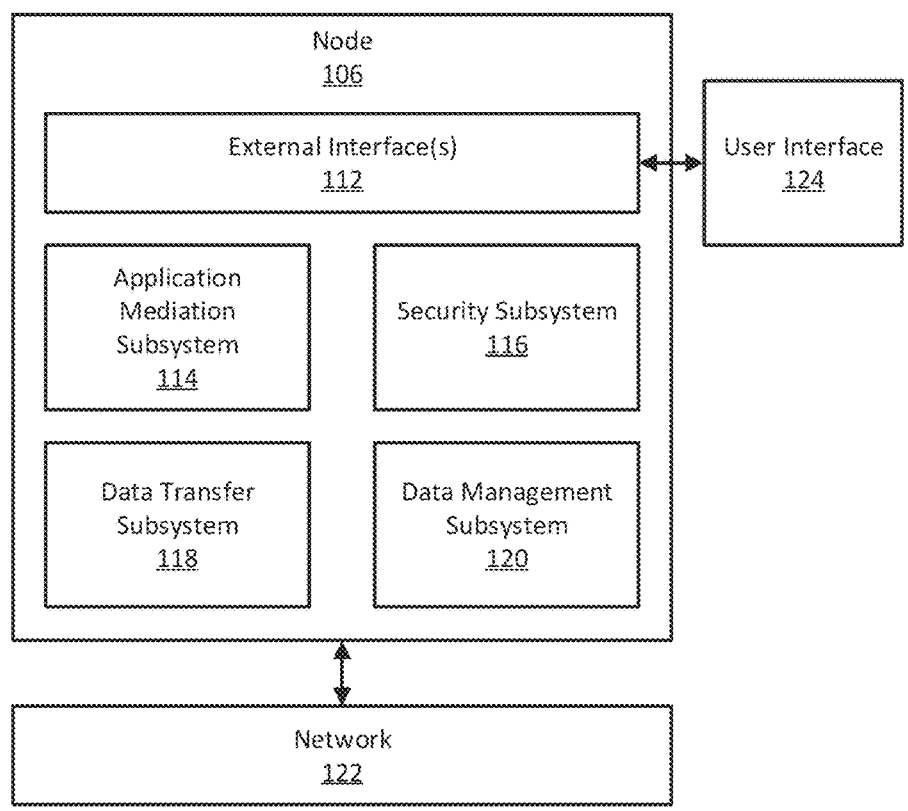

FIGS. 1A-1B are block diagrams of an example of a system 100 according to an embodiment. In an embodiment, the system 100 may include more or fewer components than the components illustrated in FIGS. 1A-1B. The components illustrated in FIGS. 1A-1B may be local to or remote from each other. The components illustrated in FIGS. 1A-1B may be implemented in software and/or hardware. Each component may be distributed over multiple applications and/or machines. Multiple components may be combined into one application and/or machine. Operations described with respect to one component may instead be performed by another component.

In an embodiment, a producer 102 is configured to transmit payload data (e.g., image data, text data, video data, and/or any other kind of payload data or combination thereof) to a consumer 110, across a network 122. A data provisioning layer 104 refers to hardware and/or software that provides an abstraction over the network 122, where the network 122 provides the physical infrastructure and basic networking protocols necessary to transmit data between devices. Specifically, the data provisioning layer 104 is configured to manage the receipt and dissemination of payload data from the producer 102 to the consumer 110, via the network 122. The data provisioning layer 104 may provide a publish/subscribe interface, whereby the consumer 110 subscribes to payload data produced by the producer 102. The producer 102 publishes payload data to the data provisioning layer 104, which disseminates the payload data across the nodes 106, 108. Dissemination within the data provisioning layer 104 may also use a publish/subscribe model between nodes. Nodes with in the data provisioning layer 104 may be heterogenous, meaning that they are different kinds of devices that communicate using different waveforms. Any combination of heterogenous devices may form a data provisioning layer 104, as long as each node supports the necessary protocols to communicate with each other (e.g., to interact with the publish/subscribe interface, to enforce security policies, and/or to generate provenance metadata as needed).

Based on the consumer 110's subscription to payload data from the producer 102, the consumer 110 obtains the payload data from the data provisioning layer 104 (e.g., from node 108D). The data provisioning layer 104 may provide payload data to the consumer 110 using a push model. For example, node 108 may notify the consumer 110 when the subscription has new payload data available. Alternatively, the data provisioning layer 104 may provide payload data to the consumer 110 using a pull/polling model. For example, the consumer 110 may periodically or intermittently query the data provisioning layer 104 to determine whether the subscription has new payload data available. The data provisioning layer 104 may use Robust Information Gateway (RIG) technology developed under the Defense Advanced Research Projects Agency (DARPA) Dynamic Network Adaptation for Mission Optimization (DyNAMO) program. Alternatively, the data provisioning layer 104 may use other technology to receive and disseminate payload data.

In an embodiment, the data provisioning layer 104 is configured to perform operations described herein for metadata-based information provenance. Specifically, as payload data passes from the producer 102 to the consumer 110, one or more nodes 106, 108 in the data provisioning layer 104 may be configured to generate provenance metadata that describes one or more actions taken, by the node(s), with respect to the payload data. Examples of operations for metadata-based information provenance, and examples of applications thereof, are described below. Provenance metadata may be expressed as rich metadata that encodes information such as information types and information attributes. For example, provenance metadata may include Resource Description Framework (RDF) literals. In addition, the provenance metadata may be generated using a provenance metadata ontology. For example, provenance metadata may be serialized as PROV Ontology (PROV-O) models or using another ontology. As described in further detail below, the provenance data may not be encoded in the payload data itself.

A node in the data provisioning layer 104 may include various components and/or subsystems. As illustrated in FIG. 1B, a node 106 may include one or more external interfaces 112. An external interface 112 refers to a set of hardware and/or software that one or more components external to the node 106 may use to access data and/or functions within the node 106.

The external interface(s) 112 may include an application programming interface (API) that allows access by applications executing outside of the node 106 (e.g., an application executing at the producer 102) to data and/or functions of the node 106. The API may operate behind an additional abstraction layer, such as the Open Mission Systems Abstract Service Bus (OMS ASB). Alternatively or additionally, the API may support interactions with a cross-domain solution (CDS). The API may allow an application to continue using the data provisioning layer 104, without any changes to the application's code, even when functionality within the data provisioning layer 104 is changed. For example, metadata-based information provenance features may be programmatically added to a data provisioning layer 104, without requiring any changes to the code of an external application that uses the data provisioning layer to publish/subscribe to payload data.

In an embodiment, an application mediation subsystem 114 is configured to mediate communication between external applications (e.g., requests received via an API as described above) and internal components of the node 106. For example, the application mediation subsystem 114 may include one or more adapters such as OMS Critical Abstraction Layer (CAL) and/or another kind of adapter. The application mediation subsystem 114 may include a cross-domain solution (CDS) agent configured to communicate with a CDS. The application mediation subsystem 114 may include one or more parsers (e.g., an extensible markup language (XML) parser and/or another kind of parser) configured to parse data received from external sources. The application mediation subsystem 114 may include one or more mappers configured to map API requests to internal functions of the node 106. For example, the application mediation subsystem 114 may include an OMS Universal Command and Control Interface (UCI) mapper configured to map UCI requests to internal functions of the node 106.

The external interface(s) 112 may include a monitoring interface. The monitoring interface provides external access to monitoring functions of the node 106, such as status information and/or functions associated with operation and configuration of the data provisioning layer 104 and/or the node 106. For example, the monitoring interface may provide access to one or more functions for configuring metadata-based information provenance (e.g., enabling, disabling, and/or changing parameters of one or more provenance functions, such as whether to generate provenance metadata when disseminating payload data within the data provisioning layer 104). The monitoring interface may provide access to functions that allow an external component to monitor operation of the data provisioning layer 104 and/or the node 106. For example, the monitoring interface may provide access to one or more functions that allow for visualization of provenance flows through the data provisioning layer 104.

The external interface(s) 112 may include a mission interface. The mission interface provides external access to load a mission template into the node 106. The mission template specifies requirements (e.g., Information Exchange Requirements (IER's) and/or another kind of requirement or combination thereof) associated with a military or other kind of objective serviced by the data provisioning layer. For example, the mission template may indicate one or more publish-subscribe relationships and/or one or more service levels for information exchanges (e.g., a minimum service level, an acceptable service level, and/or a maximum service level). The mission interface may further allow a mission template that has already been loaded to be modified or replaced.

The external interface(s) 112 may include a security interface. The security interface provides external access to one or more functions of a security subsystem 116. The security subsystem 116 is configured to protect the security of data handled by the node 106. For example, the security system 116 may provide identity management, public and/or private key management, security policy management, cryptography, and/or other security features.

In an embodiment, the security subsystem 116 is configured to use attribute-based encryption (ABE) to secure payload data and/or provenance metadata. Alternatively or additionally, the security subsystem 116 may use one or more other kinds of security policy. In general, ABE does not require end-to-end sessions or bi-directional exchange of information, making it well suited for securing data in situations where (a) sessions may be difficult to establish and secure, and (b) bi-directional data exchanges may introduce security risks. ABE includes role and content-based cryptographic and granular access control. In role-based access control, attributes describe roles. In content-based access control, attributes describe the content. ABE thus allows for granular policies and high flexibility during deployment. In addition, ABE includes collusion resistance and resilience, because principals cannot collude without combining their keys. Compromise of any number of attribute keys does not further compromise the system. Moreover, ABE includes autonomous authority operations. Each authority has full control over its identity, attribute, and key management services, with no requirement for centralized trust. Autonomous authority operations may be important, for example, in multi-authority (e.g., coalition) environments with varying levels of trust among participants. The security subsystem 116 may use different security policies to secure payload data and provenance metadata, or may use different security policies for each. Because generating provenance metadata, as described herein, does not require a node to decrypt the payload data, a security policy such as ABE allows the data provisioning layer 104 to protect the payload data while allowing for the generation of a provenance trail even for data that is encrypted.

One or more of the external interfaces 112 may be provided by a hypertext transfer protocol (HTTP) web server (not shown) operating in the node 106. The web server may be configured to receive requests (e.g., HTTP GET and/or HTTP POST requests) and supply data responsive to the requests. For example, the web server may be configured to serve web pages that include provenance flow visualizations. Alternatively or additionally, one or more of the external interfaces 112 may use a representational state transfer (REST) protocol and/or may supply data in JavaScript Object Notation (JSON) format. One or more external interface(s) 112 may use different communication protocols.

The node 106 may be configured to present data and/or functions, via one or more external interfaces 112, in one or more user interfaces 124. A user interface 124 renders user interface elements and receives input via user interface elements. A user interface 124 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of a user interface 124 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 124 may be specified in one or more other languages, such as Java, Python, Perl, C, C++, and/or any other language or combination thereof.

As noted above, the data provisioning layer 104 may be an abstraction over a network 122. The external interface(s) 112 may include a network interface configured to communicate with the network 122. A data transfer subsystem 118 may be configured to use the network interface to access the network 122, in order to send and receive data, provision data flows, communicate with other nodes in a global namespace, and/or perform other network-related functions.

For example, the data transfer subsystem 118 may be configured to match published data with subscriptions by other nodes and/or consumers. Alternatively or additionally, the data transfer subsystem 118 may be configured to use the network interface to obtain quality of service (QoS) and/or reachability information about paths and destinations within the data provisioning layer 104, to help facilitate the dissemination of payload data from producers to consumers. In an embodiment, the abstraction provided by the network interface allows for cross-waveform communication and/or QoS routing in the data provisioning layer 104, even across heterogeneous devices.

In an embodiment, the node 106 includes a data management subsystem 120. The data management subsystem 120 is configured to manage the contents (e.g., payload data) of messages flowing through the node 106. For example, the data management subsystem 120 may be configured to perform one or more data shaping operations. A data shaping operation modifies (i.e., "shapes") data into a format that is different than the format in which the data was received. Data shaping may compress, segment, or otherwise modify data to account for network congestion. For example, data shaping may downsample or otherwise transform an image to consume less data, allowing for faster transmission and/or reducing network congestion. Alternatively or additionally, the data management subsystem 120 may be configured to prioritize messages to account for message urgency (e.g., depending on mission priority), quality of service (QoS) policies, etc.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2A:
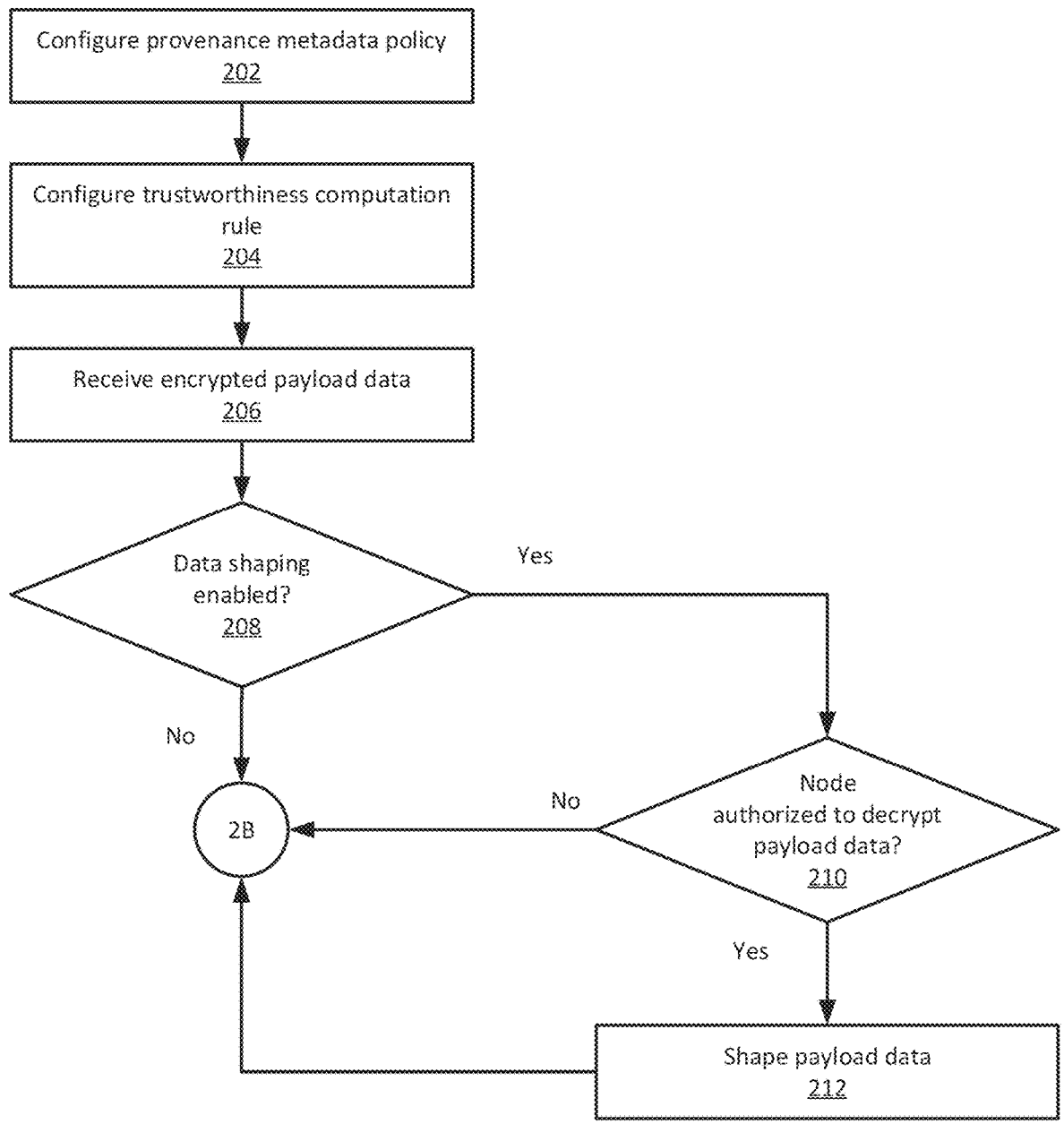
FIGS. 2A-2B are a flow diagram of an example of operations for metadata-based information provenance according to an embodiment.
Figure 2B:
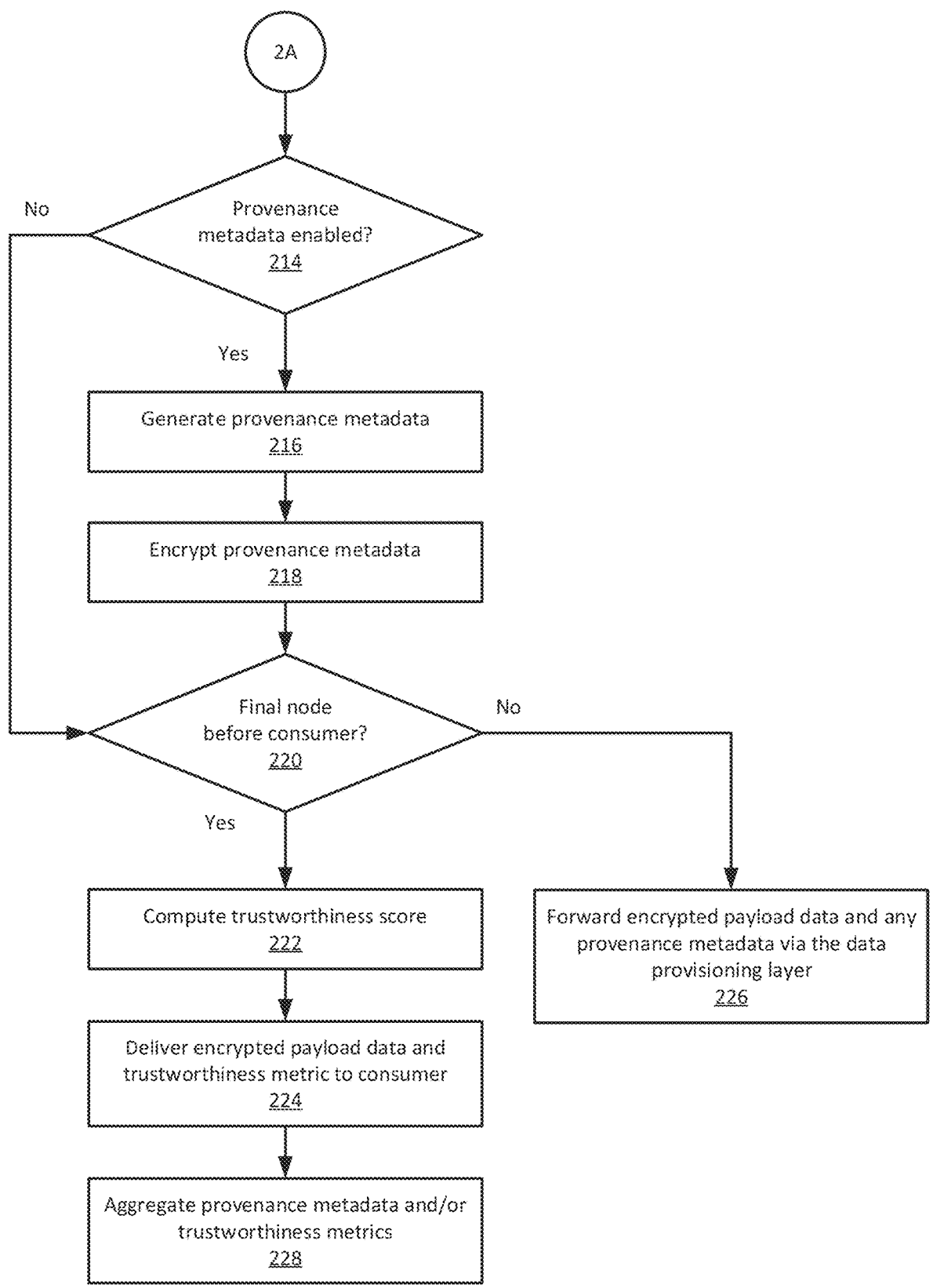

FIGS. 2A-2B are a flow diagram of an example of operations for metadata-based information provenance according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a system (e.g., one or more components of the system 100 of FIGS. 1A-1B) configures a provenance metadata policy (Operation 202). Configuring a provenance metadata policy determines, for a set of possible actions that a node may take with respect to payload data, which action(s) should trigger the generation of provenance metadata. A provenance metadata policy may be partly or wholly user-configurable. Configuring the provenance metadata policy may enable or disable provenance metadata generation for one or more of the following actions: receiving or "ingesting" payload data from a producer; disseminating payload data between nodes in the data provisioning layer; shaping or otherwise modifying payload data; transmitting payload data to a consumer; generating a trustworthiness metric; and/or another action or combination thereof. For example, in some cases, disabling provenance metadata for dissemination between nodes in the data provisioning layer may help avoid network congestion, particularly if network resources are scarce or timeliness is of the essence. On the other hand, less provenance metadata may limit a recipient's ability to assess the trustworthiness of the payload data. Therefore, the specific provenance metadata policy may reflect a subjective compromise between performance and security. In some cases, provenance metadata is always generated upon ingestion and shaping, while provenance metadata for intra-layer dissemination may be user-configurable.

In an embodiment, the system configures a trustworthiness computation rule (Operation 204). A trustworthiness computation rule supplies the logic for computing a trustworthiness metric. One or more elements of the trustworthiness computation rule may be user-configurable. For example, a trustworthiness metric may depend on how many hops the payload data took between the producer and the consumer, how many times the payload data was shaped or otherwise transformed in transit, whether the payload data passed through a cross-domain solution (CDS), and/or another factor or combination thereof. A trustworthiness metric may be a numerical value (e.g., a percentage or value on a predetermined scale). For example, the trustworthiness metric may be a scalar value in a range from 0 to 1, where 1 is highly trustworthy and 0 is not trustworthy. For a numerical value, the trustworthiness computation rule may assign weights $W1 \ldots WN$ (which may be user-configurable) to each factor $f1 \ldots fN$ (e.g., one or more factors in Table 1). The weights may be normalized to provide a trustworthiness metric in a consistent range (e.g., 0 to 1). The trustworthiness computation rule may use those weights to compute an aggregate function $T(F)$ that represents the trustworthiness of the payload data:

$$T(F) = W1*f1 + W2*f2 + \ldots$$

Alternatively, a trustworthiness metric may be a categorical value that assigns payload data to a categorical "bucket." For example, the trustworthiness metric may have possible values of high, medium, or low. The trustworthiness computation rule may map combinations of factors (e.g., one or more factors in Table 1) to the different categories. Alternatively, the trustworthiness metric may be any other kind of value that provides a consistent, comparable metric for assessing the trustworthiness of payload data.

In an embodiment, a trustworthiness computation rule is based on one or more factors (some or all of which may a user may be able to enable, disable, or otherwise configure) that relate to the confidentiality, staleness, accuracy, integrity, and/or one or more other qualities of the payload data. Table 1 illustrates some examples of factors that may contribute to a trustworthiness computation rule:

TABLE 1

Trustworthiness Factors

| Factor | Measure | Type | Rationale |
|---|---|---|---|
| Payload data traversed a CDS? | Yes/No | Integrity | Operations taken by a CDS (e.g., sanitization) may represent a protocol break. |
| Number of hops | 0 . . . N | Integrity | The risk of corruption increases as data is sent over each node in an untrusted network. |
| Payload data is ABE-encrypted? | Yes/No | Confidentiality | If data is not ABE-encrypted, it may be read by adversaries and therefore may not be trustworthy for decision-making. |
| Payload data is signed? | Yes/No | Integrity | If data is not signed, it may be corrupted by an adversary. |
| Payload data is timestamped? | Yes/No | Staleness | Data that is not timestamped may be stale and therefore unreliable for decision-making. |
| Payload data has been shaped | Yes/No | Integrity and Accuracy | Shaping means the data can be corrupted (if the shaping node is compromised) or artifacts may be introduced by a benign shaping algorithm, which may trigger issues in applications (boundary cases) |
| Geocoordinates have been mapped from one format to another? | Yes/No | Accuracy | Mapping one format of geocoordinates to another format may introduce fidelity issues due to rounding, etc. |
| Authoritative data source? | Yes/No | Accuracy | Data from an unknown/untrusted data source may not be trustworthy. |

As mentioned above, different factors may be assigned different weights to compute a trustworthiness metric. Table 2 illustrates an example of weights assigned to the factors listed in Table 1:

TABLE 2

Example of Weighted Trustworthiness Factors

| Factor | Measure | Normalized Value | Weight |
|---|---|---|---|
| Payload data traversed a CDS? | Yes/No | 1 or 0 | 0.05 |
| Number of hops | 0 . . . N | N/X, where X is the maximum trusted number of hops | 0.05 |
| Payload data is ABE- encrypted? | Yes/No | 1 or 0 | 0.1 |
| Payload data is signed? | Yes/No | 1 or 0 | 0.2 |
| Payload data is timestamped? | Yes/No | 1 or 0 | 0.1 |
| Payload data has been shaped | Yes/No | 1 or 0 | 0.2 |
| Geocoordinates have been mapped from one format to another? | Yes/No | 1 or 0 | 0.1 |
| Authoritative data source? | Yes/No | 1 or 0 | 0.2 |

In some cases, a trustworthiness computation rule may be conceptualized as a symmetrical decision tree, where each enabled factor is evaluated in the same order, regardless of what value (e.g., yes/no or 1/0) was determined for the preceding factor. Alternatively, a trustworthiness computation rule may be an asymmetrical decision tree in which certain factors definitively indicate that payload data is trustworthy or untrustworthy, regardless of the other factors. For example, in some cases, payload data that does not come from an authoritative data source can never be considered trustworthy; accordingly, that factor may be placed at the "top" of the decision tree for computational efficiency.

Alternatively or additionally, the system may use machine learning to train a machine learning model based on a labeled set of training data. For example, the training data may include multiple sets of payload data and associated provenance metadata. Each set may labeled with a supervisory signal indicating a trustworthiness metric associated with the payload data. The system may use the machine learning model to assess the trustworthiness of new payload data, based on provenance metadata generated by the system. In practice, some applications will not have enough training data available to rely on machine learning.

In an embodiment, a node in a data provisioning layer receives encrypted payload data (Operation 206). The node may receive the encrypted payload data from a producer, another node in the data provisioning layer, a cross-domain solution (CDS), or another source. If the node is receiving the payload data from a source outside the data provisioning layer (i.e., ingesting the payload data into the data provisioning layer), the payload data may be unencrypted as received, and the node may encrypt the payload data before disseminating the encrypted payload data. The node may also obtain and store metadata that describes the source of the payload data.

In an embodiment, the node determines whether data shaping is enabled (Operation 208). Data shaping may be enabled on an "always on" basis, i.e., to be performed for all data flowing through the node. Alternatively, data shaping may be enabled on an "as-needed" basis, depending on one or more factors such as network congestion, message priority, quality of service (QoS) agreements, etc. If data shaping is enabled, the node may determine whether it is authorized to decrypt the payload data (Operation 210). If the node is not authorized to decrypt the payload data, then the node may be unable to shape the payload data. Alternatively, one or more shaping operations, such as segmenting the payload data into multiple messages, may still be possible. If the node is authorized to decrypt the payload data, or if decryption is not required to shape the payload data, then the shapes the payload data (Operation 212). For example, the node may compress, segment, or otherwise modify the payload data.

In an embodiment, the node determines whether provenance metadata is enabled (Operation 214). To determine whether provenance metadata is enabled, the node may reference a provenance metadata policy. If the provenance metadata policy indicates that provenance metadata is enabled for an action to be taken by the node with respect to the payload data, then the node generates provenance metadata (Operation 216). The provenance metadata describes the action(s) that were taken by the node with respect to the payload data and for which provenance metadata is enabled.

In an embodiment, the provenance metadata includes information that uniquely associates it with the encrypted payload data. For example, a node that ingests the payload data into the data provisioning layer may generate a global unique identifier (GUID) for the payload data. To allow for associating provenance metadata with encrypted payload data without needing to decrypt the encrypted payload data, the GUID may be stored in either an unencrypted format or an encrypted format that is accessible to other nodes in the data provisioning layer. The GUID may be disseminated along with the encrypted payload data. When a node generates provenance metadata associated with the encrypted payload data, the node may store the GUID in the provenance metadata, to logically associate the provenance metadata with the encrypted payload data.

In an embodiment, the node encrypts the provenance metadata (Operation 218). The node may encrypt the provenance metadata using the same security policy (e.g., the same attribute-based encryption (ABE) policy or other kind of security policy) that was used to encrypt the payload data. Alternatively, the node may use a different security policy to encrypt the provenance metadata.

In an embodiment, the node determines whether it is the final node before the payload data reaches the consumer (Operation 220). If the node is the final node, then the node may compute a trustworthiness metric (Operation 222) based on the provenance metadata associated with the payload data. The node delivers the encrypted payload data and the trustworthiness metric to the consumer (Operation 224). In this manner, the data provisioning layer may provide the trustworthiness computation as a service to the consumer. Alternatively or additionally, the node may act as a filter for trustworthy payload data. Specifically, the node may evaluate the trustworthiness metric (e.g., by comparing it with a threshold metric that indicates a minimum acceptable level of trustworthiness) and only transmit the payload data to the consumer if the threshold is satisfied. Alternatively or additionally, the node may deliver the encrypted payload data along with the provenance metadata associated with the payload data. The consumer may itself compute a trustworthiness metric based on the provenance metadata.

In some cases, the node may compute updated trustworthiness metrics as additional provenance metadata becomes available (for example, if the data provisioning layer disseminates provenance metadata and payload data in separate messages, which may not arrive at the node simultaneously). The node may compute and provide a trustworthiness metric to the consumer even after the payload data has already been provided to the consumer. The node may release payload data to the consumer even if insufficient provenance metadata is available to compute an initial trustworthiness metric. Alternatively or additionally, in response to receiving additional provenance metadata, the node may compute and provide an updated version of a previously computed and provided trustworthiness metric. When the node provides a trustworthiness metric to the consumer, the node may include a confidence metric that indicates a level of confidence (e.g., high/medium/low, or a value on a numerical scale such as 0 to 1) in the trustworthiness metric. For example, confidence in the trustworthiness metric may be relatively low if the trustworthiness metric is based on a small or incomplete set of provenance metadata, and higher if the trustworthiness metric is based on a large or complete set of provenance metadata.

In an embodiment, if the node is not the final node (i.e., as determined in Operation 220), then the node forwards the encrypted payload data and any provenance metadata associated with the payload data (i.e., provenance metadata generated by the node and/or one or more previous nodes that handled the payload data) via the data provisioning layer (Operation 226). Another node in the data provisioning layer may receive encrypted payload data and provenance metadata and perform one or more operations described above to continue advancing the message(s) across the network toward the consumer.

In an embodiment, the system aggregates provenance metadata and/or trustworthiness metrics (Operation 228) generated over multiple payload data transmissions. For example, the system may store provenance metadata and/or trustworthiness metrics in a database that supports querying across multiple metadata records. Aggregated provenance metadata and/or trustworthiness metrics may be used to generate additional metrics, analyze and/or visualize provenance flows, and/or generate other kinds of insights regarding data dissemination through the data provisioning layer. For example, trustworthiness metrics over time may indicate a trend. New payload data not conforming to the trend may be considered an outlier, and may thus be considered less trustworthy. Such determinations may use statistical analysis (e.g., establishing a trend line and determining whether a new metric falls excessively far from the trend line) or model-based analysis (e.g., modeling data transmission speeds between nodes and determining whether the reported speed of transmission of a particular payload data conforms to the model). In an embodiment, linear regression is used to identify outliers. For each data point in the aggregated data, the system calculates the distance from a fitted line. The system may store information in a stack data structure, remove the top value from the stack, and calculate outlier influence with Cooke's formula:

$$D_i = \frac{\sum_{j=1}^{n}(\hat{Y}_j - \hat{Y}_{j(i)})^2}{(p+1)\hat{\sigma}^2}$$

Alternatively, another technique may be used to identify outliers.

Detailed examples are described below for purposes of clarity. Components and/or operations described below should be understood as examples that may not be applicable to one or more embodiments. Accordingly, components and/or operations described below should not be construed as limiting the scope of one or more embodiments.

Figure 3A:
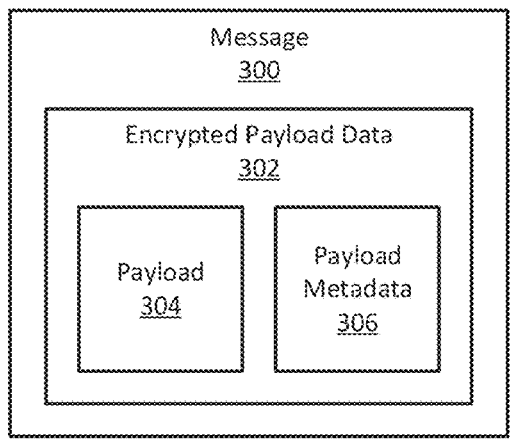
FIGS. 3A-3C are block diagrams of examples of messages according to an embodiment.
Figure 3B:
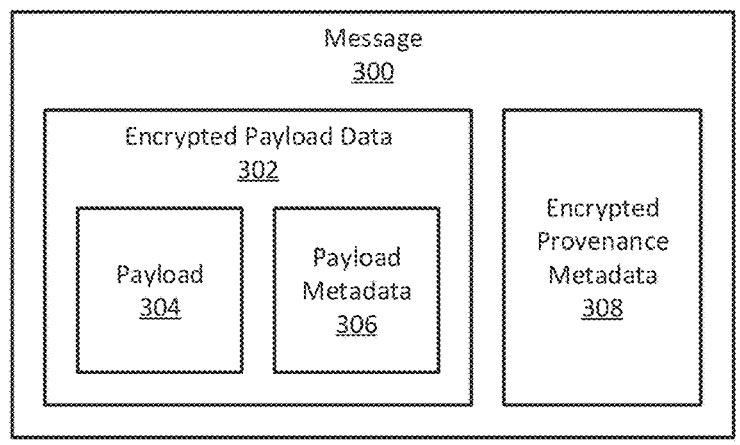
Figure 3C:
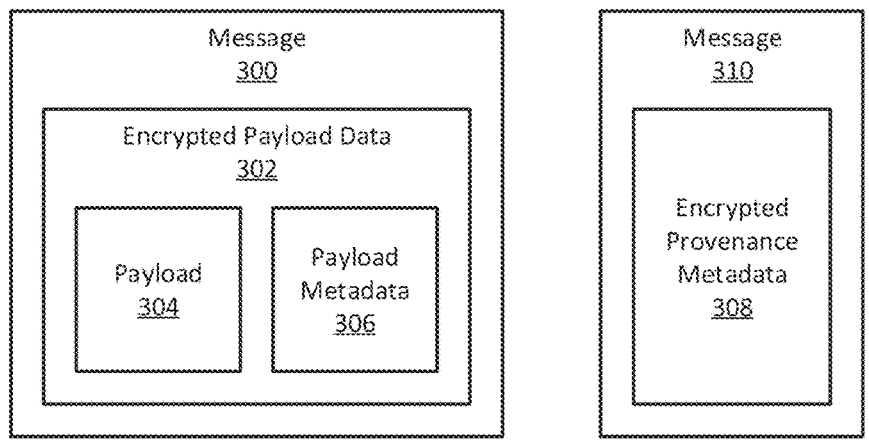

FIGS. 3A-3C are block diagrams of examples of messages according to an embodiment. FIG. 3A illustrates a message 300 that includes encrypted payload data 302, without any provenance metadata. The encrypted payload data 302 includes the payload 304 itself, and may also include payload metadata 306. Payload metadata 306 is metadata that describes the payload 304. For example, the payload metadata 306 may include information such as a timestamp indicating when the payload 304 was created, a timestamp indicating when the payload 304 was last modified, an author of the payload 304, a data size of the payload 304, and/or another type of metadata or combination thereof.

When a node generates provenance metadata, the provenance metadata may be included as part of the same message as the payload data, or may be part of a separate message. In FIG. 3B, encrypted provenance data 308 is bundled into the same message 300 as the encrypted payload data 302. In this example, the encrypted payload data 302 and encrypted provenance metadata 308 are disseminated simultaneously, as part of the same message 300. In FIG. 3C, the encrypted provenance metadata 308 is bundled in a separate message 310 from the encrypted payload data 302. In this example, the two messages 300, 310 may be disseminated at the same time or asynchronously. Thus, a node or consumer receiving the message 300 with the encrypted payload data 302 may have the option of processing (e.g., decrypting, disseminating, and/or otherwise processing) the encrypted payload data 302 even if the message 310 with the encrypted provenance metadata 308 has not been received. This approach may be useful, for example, if the encrypted payload data 302 is urgent or otherwise time-sensitive, and where bundling the encrypted provenance metadata 308 in the message 300 may compromise the timeliness of the message 300 (for example, in conditions where network congestion makes it easier to transmit smaller messages). Separating the messages 300, 310 may also be useful in situations where nodes and/or consumers do not make trustworthiness determinations based on provenance metadata, but use provenance metadata to asynchronously analyze provenance flows and/or other network properties.

Figure 4:
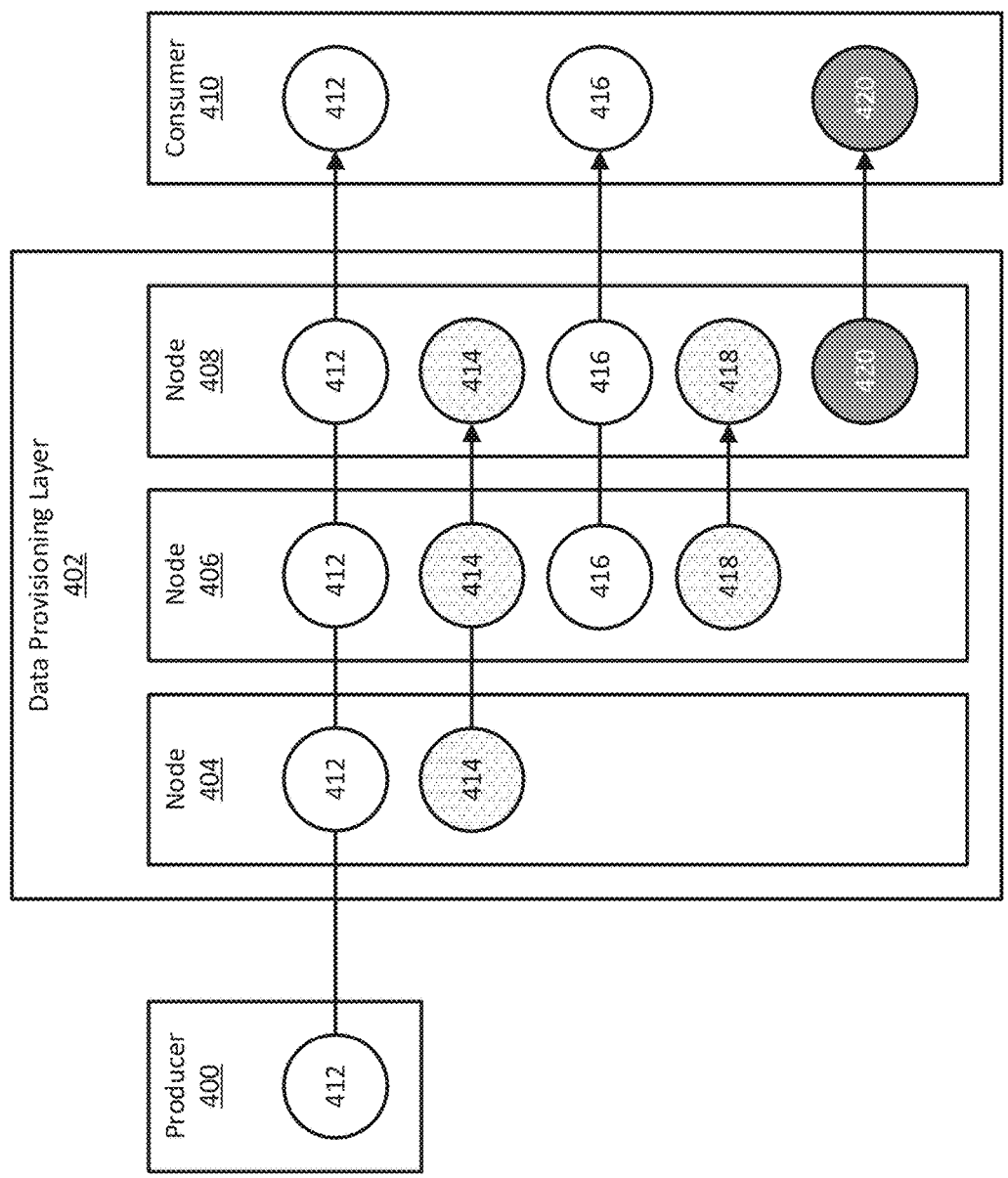
FIG. 4 illustrates an example of metadata-based information provenance according to an embodiment.

FIG. 4 illustrates an example of metadata-based information provenance according to an embodiment. In this example, a producer 400 publishes payload data 412 to a data provisioning layer 402. A node 404 receives the payload data (i.e., ingests the payload data 412 into the data provisioning layer 402) and generates provenance metadata 414 indicating that the node 404 received the payload data 412. The provenance metadata 414 may include metadata that identifies the node 404, a timestamp when the payload data 412 was ingested, and/or another kind of metadata.

Node 406 in the data provisioning layer 402 receives the payload data 412 and the provenance metadata 414 from node 404 (either in a single message or separate messages, as described above). In this example, node 406 shapes the payload data 412 by generating a compressed version 416 of the payload data. Node 406 generates provenance metadata 418 that describes the shaping action. In this example, provenance metadata for dissemination between nodes of the data provisioning layer 402 is disabled, so the node 406 does not generate any provenance metadata to indicate receipt of the payload data 412.

Node 408 in the data provisioning layer 402 receives the original payload data 412, the provenance metadata 414 generated by node 404, the compressed payload data 416, and the provenance metadata 418 generated by node 406. As described above, node 408 may receive some or all of these items asynchronously. Because metadata for dissemination between nodes of the data provisioning layer 402 is disabled, node 408 does not generate any provenance metadata to indicate receipt of the payload data 412 or the compressed payload data 416.

In this example, node 408 is the final node in the data provisioning layer 402 before the payload data 412 reaches a consumer 410. Based on the provenance metadata 414 generated by node 404 and the provenance metadata generated by node 406, node 408 computes a trustworthiness metric 420. The consumer 410 receives the payload data 412, the compressed payload data 416, and the trustworthiness metric 420 from node 408. Alternatively, the consumer 410 may receive the provenance metadata 414, 418 and compute a trustworthiness metric based on the provenance metadata 414, 418. As described above, the consumer 410 may receive some or all of these items asynchronously.

Figure 5:
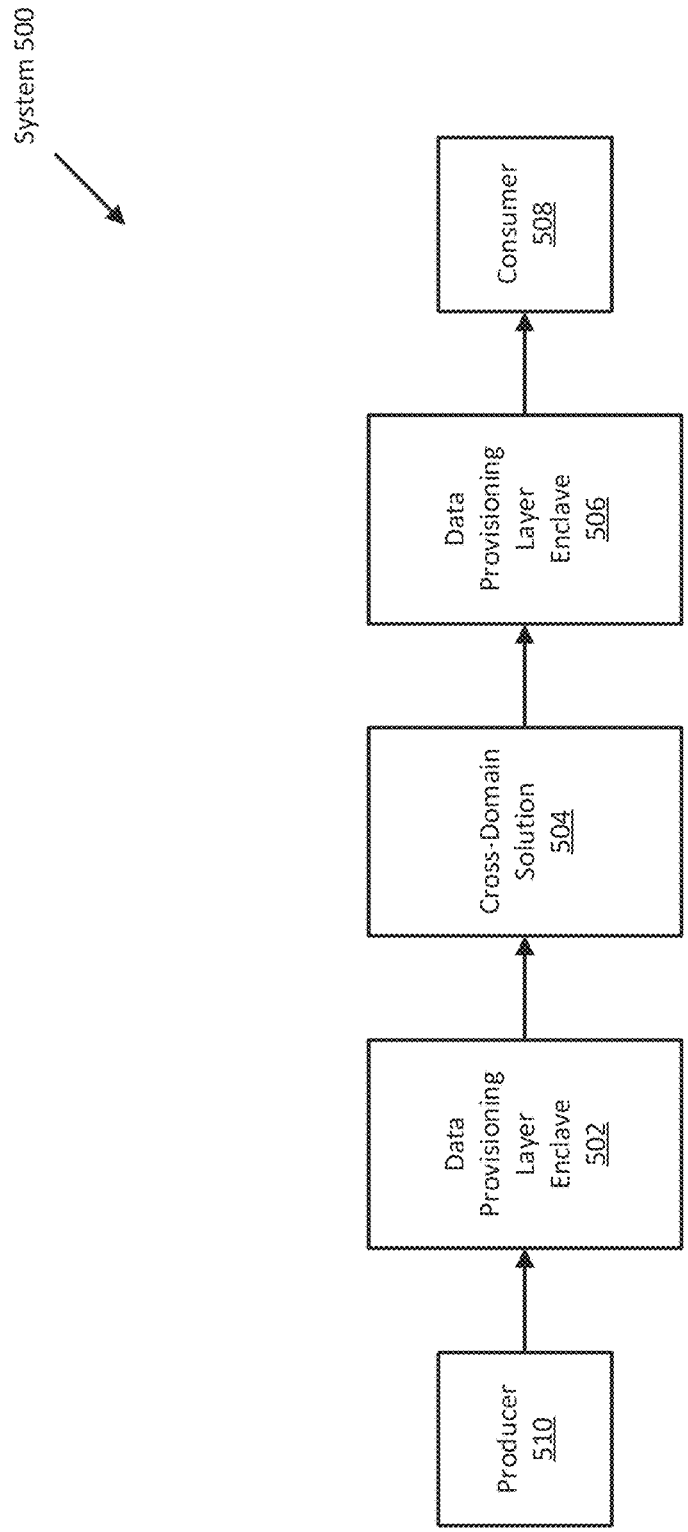
FIG. 5 is a block diagram of an example of a system according to an embodiment.

FIG. 5 is a block diagram of an example of a system according to an embodiment. Specifically, FIG. 5 illustrates an example of a system 100 in which a producer 510 and a consumer 508 are separated by a cross-domain solution 504. To disseminate payload data from the producer 510 to the consumer 508, a data provisioning layer may be logically separated into two or more "enclaves" of nodes: data provisioning layer enclave 502 and data provisioning layer enclave 506. Each of the enclaves 502, 506 may include one or more nodes configured to operate as described above. The enclaves 502, 506 may be part of a single data provisioning layer operated by the same entity (e.g., a company, military organization, or other entity), or may be operated by separate entities. When a node in data provisioning layer enclave 506 receives payload data from the cross-domain solution 504, the node may be configured to generate different kinds of provenance metadata, depending on how much information the cross-domain solution 504 reports. For example, if the cross-domain solution 504 reports that it shaped or otherwise transformed the payload data in some way, the node may generate provenance metadata that describes the action(s) taken by the cross-domain solution 504. Alternatively, if the cross-domain solution 504 operates as a "black box" and does not report its actions, the node may generate provenance metadata that indicates ingestion of the payload data into the data provisioning layer enclave 506. As noted above, the provenance metadata generated may depend on a provenance metadata policy.

Figure 6:
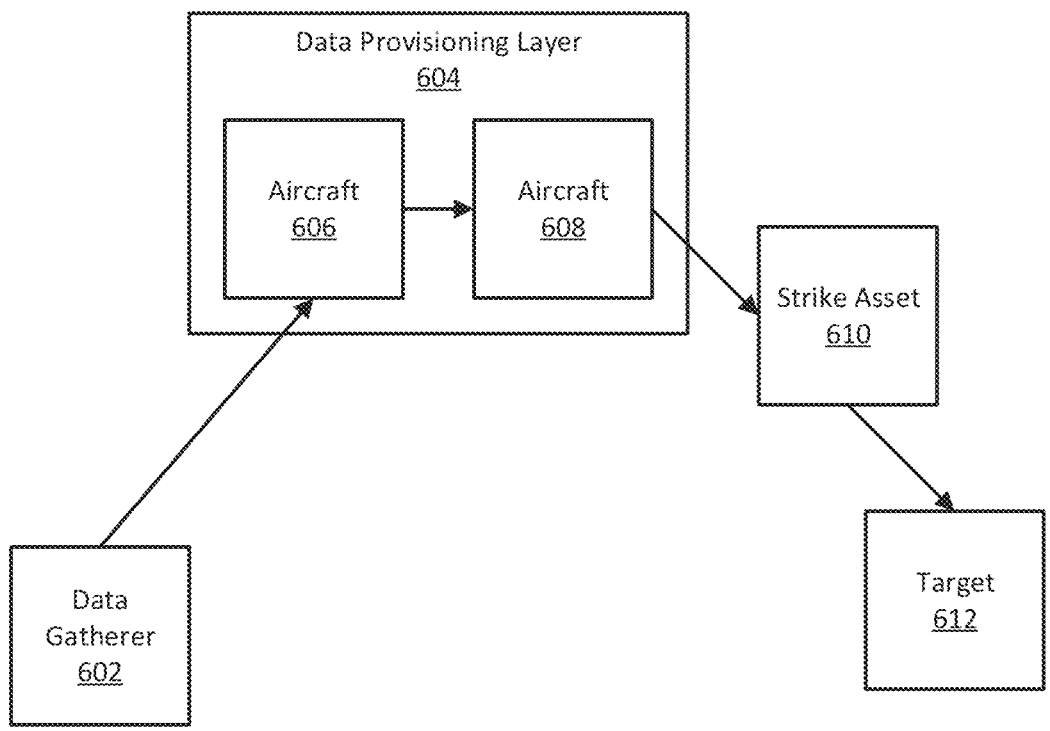
FIG. 6 illustrates an example of metadata-based information provenance at the tactical edge according to an embodiment.

FIG. 6 illustrates an example of metadata-based information provenance at the tactical edge according to an embodiment. A data gatherer 602 is configured to gather mission-critical data. In this example, the data gatherer is an imaging device configured to gather payload data that includes target imagery with geo-locating metadata. The data gatherer 602 publishes the payload data to a data provisioning layer 604. In this example, the data provisioning layer 604 is implemented across aircraft 606, 608 that are configured to communicate with each other (e.g., via line-of-site and/or beyond-line-of-sight waveforms). Aircraft 606 ingests the payload and generates provenance metadata describing the ingestion. Because the payload data is mission-critical, aircraft 606 prioritizes dissemination of the imagery and provenance metadata to aircraft 608 within the data provisioning layer 604. Aircraft 608 computes a trustworthiness metric based on the provenance metadata. Aircraft 608 supplies the imagery and the trustworthiness metric to a strike asset 610 (e.g., an airborne or ground asset, which may be manned or unmanned) at the tactical edge. The payload data may also be used to securely task a strike asset 610 with the capacity (e.g., line of sight, appropriate ordnance, etc.) to strike the target 612. The strike asset 610 compares the trustworthiness metric with a threshold trustworthiness criterion, to determine whether the imagery can be trusted. Alternatively, aircraft 608 may compare the trustworthiness metric with a threshold trustworthiness criterion; and if the trustworthiness metric indicates that the imagery cannot be trusted, aircraft 608 may refrain from delivering the imagery to the strike asset 610. If the imagery can be trusted, then the strike asset 610 uses the imagery to locate and strike the target 612.

Trust Policies

Figure 8:
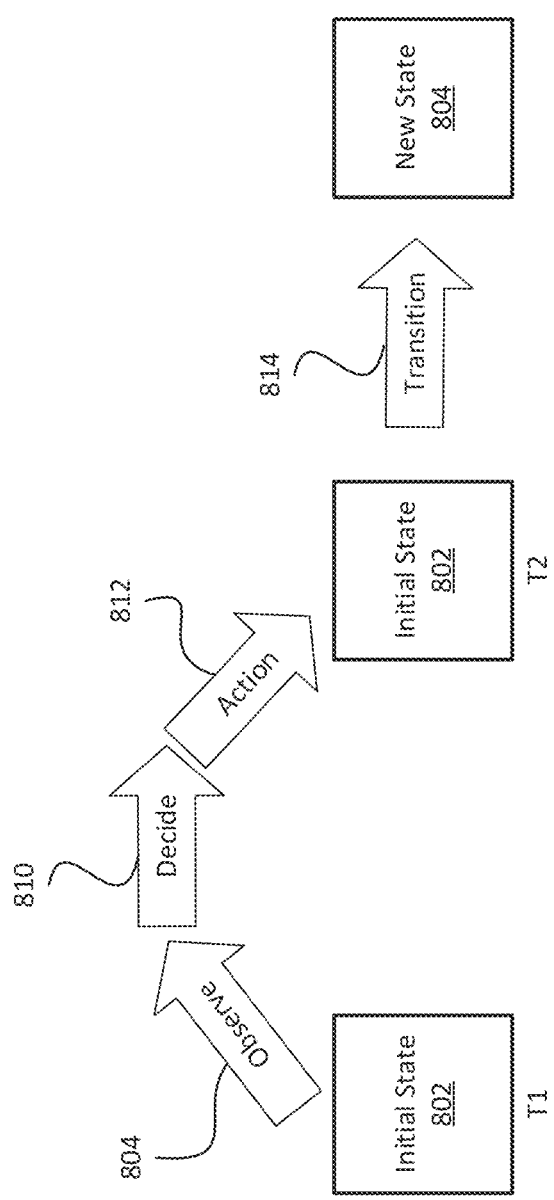
FIG. 8 is a block diagram of an example of a state transition according to an embodiment.

In general, a composite accumulation of situational awareness information helps build an understanding of the current state of a system. As actions are taken on that state, the state may change. Correctly updating a state over time (e.g., periodically and/or responsive to detected changes) requires collecting new information on a continuous or ongoing basis. Specifically, taking an action with respect to a given state is predicated on correct observation of the current state. For example, FIG. 8 is a block diagram of an example of a state transition according to an embodiment. Starting from an initial state 802 at time T1, the system observes 804 (e.g., by receiving sensor data and/or other kinds of situational awareness data) and, based on the observation(s), decides 810 whether to take an action 812. Responsive to taking the action 812 and/or receiving new observational data, the system transitions 814 from the initial state 802 to a new state 804. Correct observation requires enough data, from enough sources, to obtain a sufficiently accurate representation of the state.

To make useful decisions, the system must be able to "believe" (i.e., determine to a sufficient level of certainty, for example, by satisfying a predetermined threshold level of certainty) that the state representation is trustworthy. Specifically, the system must believe that the information (a) is accurate and (b) can support decision-making with respect to taking a particular action contingent on the state. As used herein, a "decision" refers to a choice between two or more options. Given multiple data points relevant to a decision (e.g., attributes associated with a payload, as discussed herein), those data points may be weighted to reflect their relative importance (e.g., as determined by one or more stakeholders) in making a given decision. The importance of a given attribute may depend on one or more global and/or local factors.

In the absence of trusting all data equally, as used herein, an "opinion" is a set of data that reflects an understanding of the accuracy of a set of information. An opinion may be generated based on direct and/or indirect knowledge, including but not limited to: (1) "evidence," i.e., metadata (information gathered about the data) gathered as the data moves through the network, which aids in judging the data's reliability; and (2) "context," i.e., the circumstances under which the data is gathered (e.g., where the data was gathered), how the data is being used (e.g., the mission), who gathered the data (e.g., the source node's role), etc.

From a trustworthiness perspective, data may be assumed to be protected from active disinformation (i.e., manipulation by malicious actors) by virtue of the system's security model. That is, protecting against active disinformation may be considered within the scope of data security, rather than trust policies. However, even without accounting for active disinformation, not all information can be taken at face value, i.e., trusted equally. Multiple factors may affect data's trustworthiness and/or render the data "unbelievable."

The source of data is one factor that may affect its trustworthiness. Is the source in a position to provide actionable information? Who generated the data? Is the method and/or type of data collection applicable to the current decision? What is the data's provenance since generation? Where is the data taken with respect to the subject?

Fidelity is another factor that may affect data's trustworthiness. Has the precision of the data been compromised? What transformations has the data undergone? Is there evidence of passive misinformation, i.e., errors in data transmission that may not be attributable to any malicious actor?

Accuracy is yet another factor that may affect data's trustworthiness. Are there issues with the generation of the data? How old is it? Does the likely accuracy of the data degrade with time? For example, does the data include time-sensitive position and location information (PLI) and/or images that become unreliable with the passage of time? Is there evidence that there is a failure in data collection, such as a mechanical and/or software failure? For example, is there evidence that a sensor is miscalibrated, damaged, or otherwise providing wrong or stale information?

Some examples of source-, fidelity-, and accuracy-related attributes are discussed in further detail below. Techniques described herein allow for decision-making given opinions about the information that is available.

As noted above, in an embodiment, a decision-making system or node needs to choose between available actions (or inaction) based on the relevant attributes. The relevant attributes may be a subset of all the attributes available. The received value of an attribute may be considered an opinion about the attribute and may be treated as fact (as opposed to the data itself, which is not treated as fact). The weight associated with a particular attribute indicates how important it is to the decision. For example, attribute weights may be values along a scale, with a value at one end of the scale indicating total insignificance to the decision and a value at the other end of the scale indicating utmost importance.

In general, opinions may be derived from two kinds of trust, referred to here as "functional" trust and "referral" trust. Functional trust is based on inherent, observable trust factors. For example, functional trust may depend on the presence of conditions that allow a device to operate correctly and generate accurate data (as opposed to incorrect and/or degraded data, for example). As another example, functional trust may depend on the likelihood of potential vulnerabilities (for example, older encryption keys that are more likely to have been compromised than newer encryption keys). Referral trust is based on beliefs and/or other properties of neighboring system or node. For example, the topology of a system of nodes may form a trust network. Irregularities in values received from a neighbor, weak beliefs, and/or strong uncertainties, etc. may be associated with lower referral trust.

Figure 9:
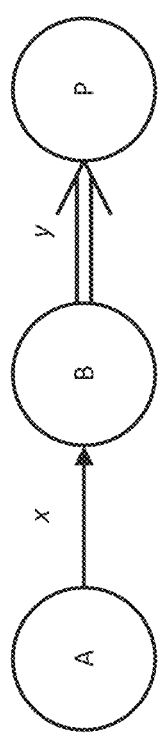
FIG. 9 is a block diagram of an example of functional trust and referral trust according to an embodiment.

Opinions may be represented using subjective logic. For example, in an embodiment, an opinion x is represented as a triple of {belief b, disbelief d, uncertainty u}. If $x_b+x_d+x_u=1$, then each component of the triple is a weighting factor. FIG. 9 is a block diagram of an example of functional trust and referral trust according to an embodiment. As shown in FIG. 9, given a proposition P, where B forms an opinion y:

B's opinion about the data it has collected is functional trust. That is, B gains insight through functional trust of proposition P.

A's opinion of B's trustworthiness is referred trust. That is, A gains insight by learning that B has insight, but A does not have direct insight (no functional trust) of P.

The "trust chain" provides functional trust at the final edge and referral trust at each edge along the chain.

In an embodiment, a consensus operator computes an aggregation of trust from the source node (which may also be referred to as the "generator") to the target node (i.e., the consumer of the information). The consensus operator may receive, for example, a source opinion triple and factor in uncertainty between the two nodes, to generate a new opinion triple that represents their consensus. For example:

$$x \oplus y = \frac{(x_u y_b + y_u x_b, x_u y_d + y_u x_d, x_u y_u)}{x_u + y_u - x_u y_u}$$

Figure 10:
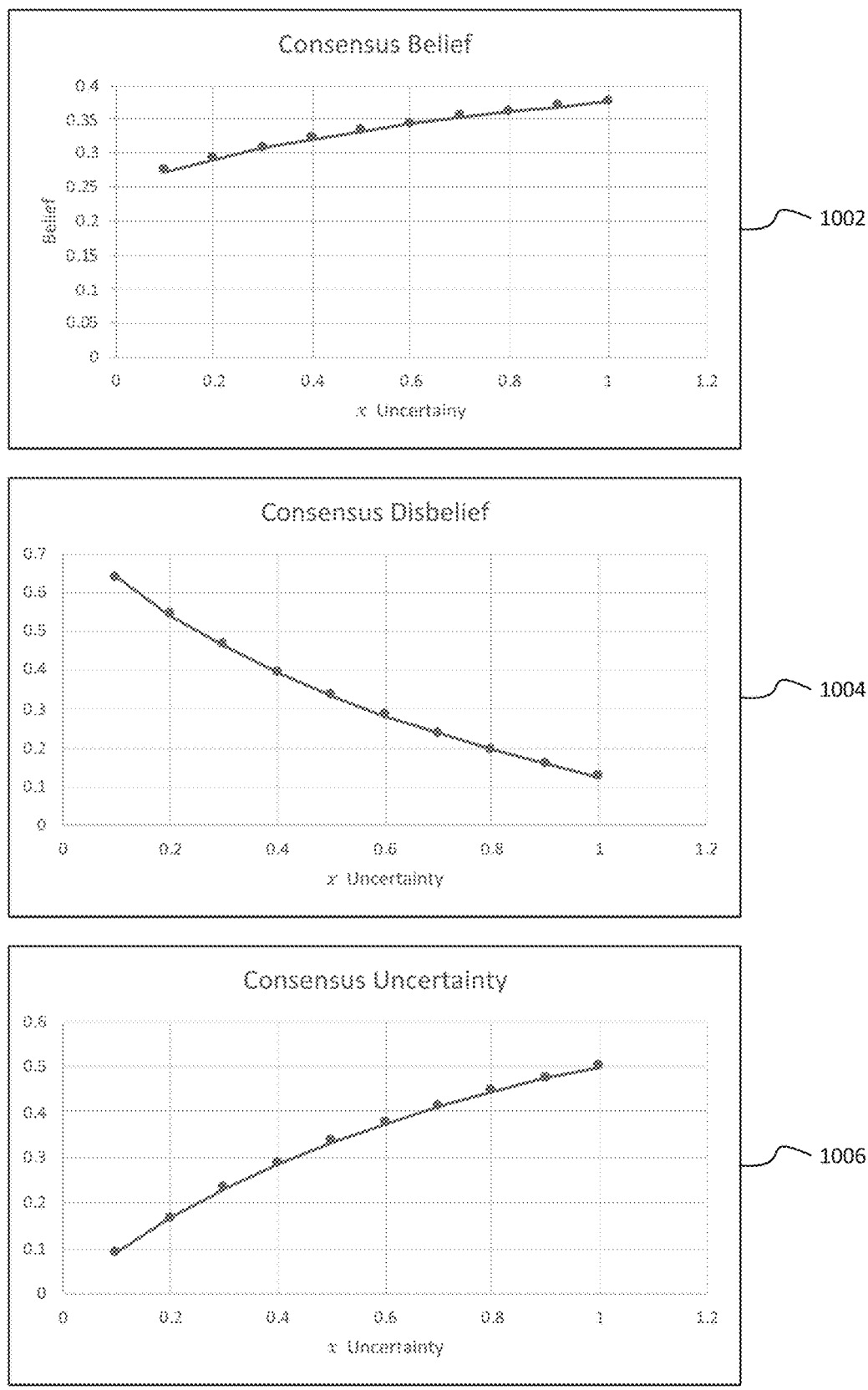
FIG. 10 illustrates charts of consensus belief, consensus disbelief, and consensus uncertainty according to an embodiment.

FIG. 10 illustrates charts of consensus belief 1002, consensus disbelief 1004, and consensus uncertainty 1006 according to an embodiment. Specifically, FIG. 10 uses the example equation above; $y_b=0.25$, $y_d=0.25$, and $y_u=0.5$, so that the three y values sum to 1; $x_b=0.25$, $x_d=$is calculated so the opinion sums to 1, and $x_u$ (the x-axis) is the range [0.1, 1.0] by 0.1 increments.

In an embodiment, an opinion-discounting operator represents the flow of information from one node to another. Referral trust propagates through a trust network, updating each node along the way. The opinion-discounting operator may receive, for example, two opinion triples and introduce a function g(x) that is a scalar that denotes the proportion of evidence that is transferred from one node to another. The opinion-discounting operator may use $x_b$, i.e., the belief portion of the opinion triple. For example:

$$x \boxtimes y = \frac{(g(x)y_b, g(x)y_d, y_u)}{(y_b + y_d)g(x) + y_u}$$

Table 3 below shows examples of attributes (collectively referred to as "evidence") that may be used to generate an opinion that informs a decision about an action according to an embodiment. The attributes shown in Table 3 are examples only and should not be construed as limiting the scope of one or more embodiments.

TABLE 3

Example Trustworthiness Attributes

| Type | When Collected | Metadata | Rationale |
|---|---|---|---|
| Source | Data Ingress | Node ID | Source taken in context of environment and mission |
| | Data Deriving Data Versioning | Node ID | Provenance of the data as versioned |
| | Data Fusion | Node IDs of Data Sources | Provenance of the data as synthesized |
| Fidelity | Data Translation | Node ID from Format to Format | Loss of fidelity by expression of data in different formats |
| | Data Shaping | Node ID from Resolution to Resolution | Loss of resolution of the data by shaping |
| | CDS Redaction | Yes/No | Loss of resolution or content by CDS policy redaction |
| | CDS Translation | Yes/No | Loss of fidelity by expression of data in different formats acceptable by the CDS |
| Accuracy | Data Ingress | Timestamp | Stale data may be less accurate than fresh |
| | Sensor Data Emission | | Sensor faulty or miscalibrated; discover by examining time series of data for reasonableness |

Storing node identifiers (IDs) as shown in Table 3 provides provenance information that indicates the places in the system where a node has processed or "touched" (and optionally changed) the information. This provenance information may be a factor in determining the trustworthiness of the information.

Figure 11:
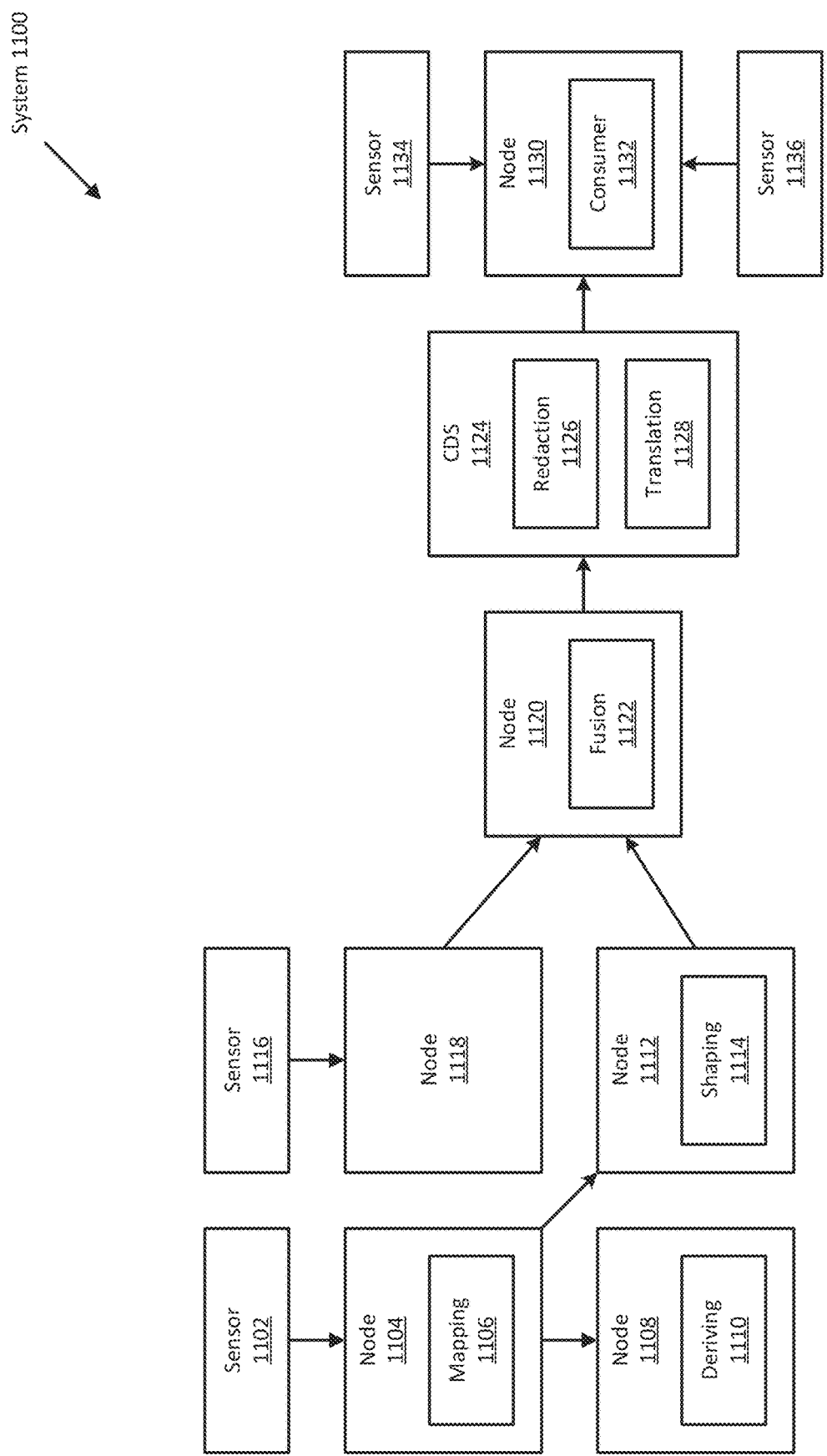
FIG. 11 illustrates an example of a system according to an embodiment.

FIG. 11 illustrates an example of a system 1100 according to an embodiment. In this example, the system 1100 includes multiple nodes in a data provisioning layer, separated by a cross-domain solution (CDS) 1124. Nodes 1104, 1118 are configured to receive data from sensors 1102, 1116, respectively. Node 1104 is configured to perform mapping 1106 on the data from sensor 1102 and forward the data to nodes 1108, 1112. Node 1108 is configured to perform deriving 1110 to derive a new version of the data. Node 112 is configured to perform shaping 1114 on the data before forwarding the data to node 1120. Node 1118 forwards the data from sensor 1116 to node 1120 without modification.

Node 1120 is configured to perform fusion 1122, to fuse the two sets of data received from nodes 1112, 1118, and forwards the fused payload to CDS 1124. The CDS 1124 performs redaction 1126 and translation 1128 on the payload before forwarding the transformed payload to node 1130 at the other side of the CDS boundary.

In this example, node 1130 includes a consumer 1132 configured to take some kind of action based on data received across the data provisioning layer, including additional data received from sensors 1134, 1136. Specifically, consumer 1132 is configured to apply a trust policy to evaluate the trustworthiness (e.g., source, fidelity, and/or accuracy) of the data before deciding what action, if any, to take. For example, consumer 1132 may generate a trust metric, which may be a scalar (e.g., in a range), binary (e.g., 0/1, no/yes, etc.), or other type of value. Based on the trust metric, consumer 1132 decides how to deal with the data. For example, consumer 1132 may compare the trust metric with a threshold value. If the trust score satisfies the threshold value, then consumer 1132 treats the data as trustworthy and decides to take action in reliance on that data.

In an embodiment, trust policies are not necessarily identical between consumers. Trust policies may be configurable, in terms of which attribute(s) is/are considered relevant and the weights applied to each attribute. One or more embodiments thus provide a flexible framework for adjudicating the trustworthiness of data transmitted over a data provisioning layer. Evidence, context, and mission (as defined herein) are inputs to local decision-making that produces more relevant results than if a single trust policy were applied to all consumers.

General; Computer Systems; Networking

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 7:
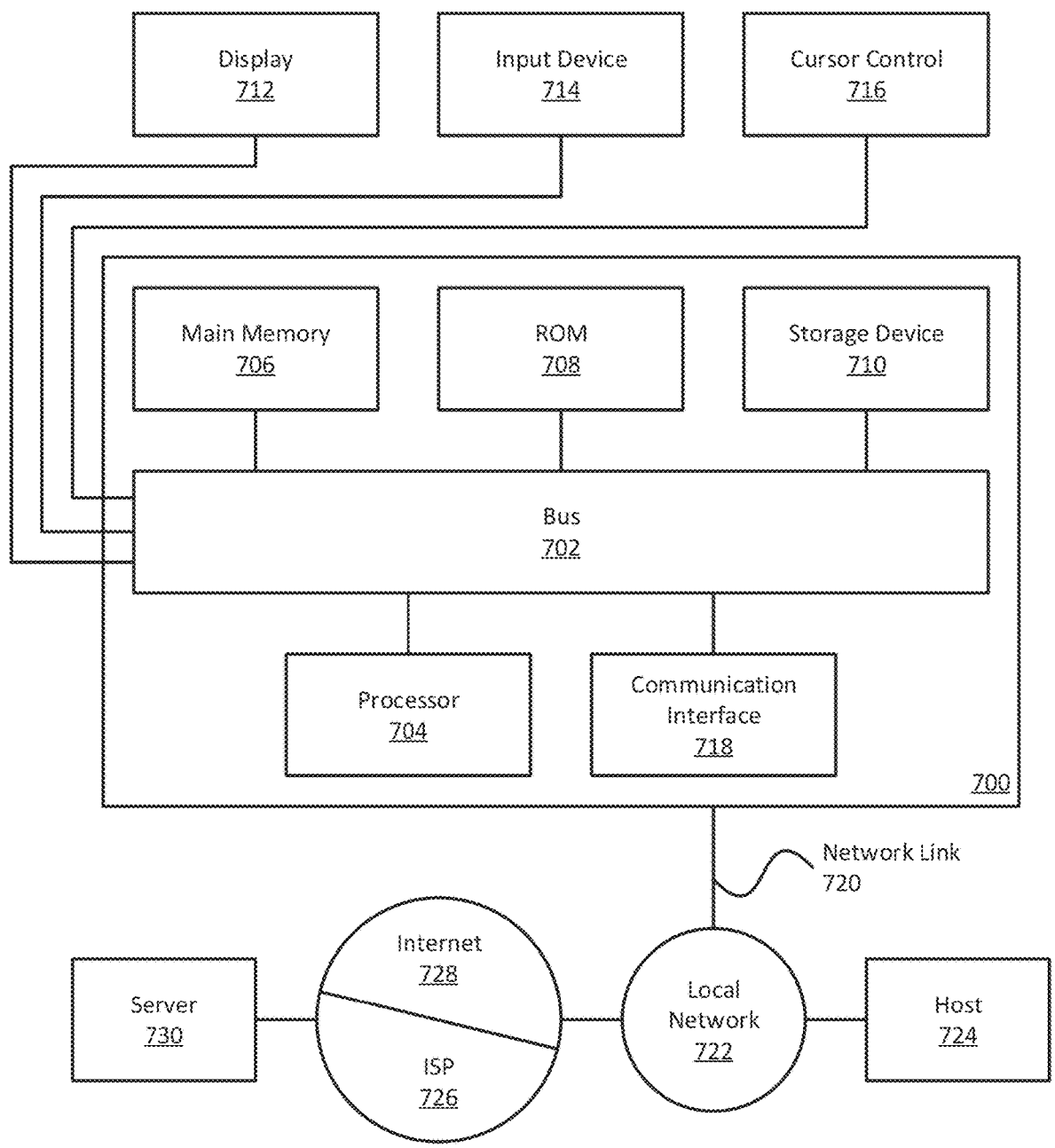
FIG. 7 is a block diagram of an example of a computer system according to an embodiment.

For example, FIG. 7 is a block diagram of an example of a computer system 700 according to an embodiment. Computer system 700 includes a bus 702 or other communication mechanism for communicating information, and a hardware processor 704 coupled with the bus 702 for processing information. Hardware processor 704 may be a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in one or more non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or additionally, computer system 700 may receive user input via a cursor control 716, such as a mouse, a trackball, a trackpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Alternatively or additionally, computer system 7 may include a touchscreen. Display 712 may be configured to receive user input via one or more pressure-sensitive sensors, multi-touch sensors, and/or gesture sensors. Alternatively or additionally, computer system 700 may receive user input via a microphone, video camera, and/or some other kind of user input device (not shown).

Computer system 700 may implement the techniques described herein using customized hard-wired logic, one or more ASICs or FPGAs, firmware, and/or program logic which in combination with other components of computer system 700 causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may include non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires of bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 700 may receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor 704 as it is received, and/or stored in storage device 710, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A method comprising:
   receiving, by a first node in a data provisioning layer, payload data to be delivered to a recipient;
   obtaining, by the first node, a trust policy indicating a plurality of attributes used to determine trustworthiness of payloads;
   determining, by the first node, a first set of values of the plurality of attributes associated with the payload data;
   generating, by the first node, a first trustworthiness opinion based at least on the trust policy and the first set of values of the plurality of attributes;
   transmitting, by the first node, the payload data and the first trustworthiness opinion via the data provisioning layer toward the recipient;
   receiving, by a second node in the data provisioning layer from the first node, the payload data and the first trustworthiness opinion;
   obtaining, by the second node, the trust policy indicating the plurality of attributes used to determine trustworthiness of payloads;
   determining, by the second node, a second set of values of the plurality of attributes associated with the payload data;
   generating, by the second node, a second trustworthiness opinion based at least on the trust policy and the second set of values of the plurality of attributes; and
   transmitting, by the second node, the payload data and the second
   trustworthiness opinion via the data provisioning layer toward the recipient.

2. The method of claim 1, further comprising:
   receiving, by the first node, a second trustworthiness opinion associated with the payload data,
   generating the first trustworthiness opinion being further based on the second trustworthiness opinion.

3. The method of claim 1, further comprising:
   transforming, by the node, the payload data before transmitting the payload data toward the recipient.

4. The method of claim 1, the payload data originating from a sensor, and generating the first trustworthiness opinion comprising analyzing a time series of the payload data to determine heuristically whether the payload data originating from the sensor is practically reasonable.

5. The method of claim 1, the trustworthiness opinion comprising at least a belief metric, a disbelief metric, and an uncertainty metric.

6. The method of claim 1, the trust policy comprising a plurality of weights indicating relative importance of respective attributes in the plurality of attributes.

7. The method of claim 1, the plurality of attributes used to determine trustworthiness of payloads comprising one or more of a source node identifier, a redaction flag indicating whether the payload data has been redacted, or a translation flag indicating whether the payload data has been translated from one format to another format.

8. The method of claim 1, the plurality of attributes used to determine trustworthiness of payloads comprising at least one attribute that is directly observable by the first node and at least one attribute that is referred by another node in the data provisioning layer.

9. One or more non-transitory computer-readable media storing instructions that, when executed by one or more processors, cause the one or more processors to perform operations comprising:
  receiving, by a first node in a data provisioning layer, payload data to be delivered to a recipient;
  obtaining, by the first node, a trust policy indicating a plurality of attributes used to determine trustworthiness of payloads;
  determining, by the first node, a first set of values of the plurality of attributes associated with the payload data;
  generating, by the first node, a first trustworthiness opinion based at least on the trust policy and the first set of values of the plurality of attributes; and
  transmitting, by the first node, the payload data and the first trustworthiness opinion via the data provisioning layer toward the recipient;
  receiving, by a second node in the data provisioning layer from the first node, the payload data and the first trustworthiness opinion;
  obtaining, by the second node, the trust policy indicating the plurality of attributes used to determine trustworthiness of payloads;
  determining, by the second node, a second set of values of the plurality of attributes associated with the payload data;
  generating, by the second node, a second trustworthiness opinion based at least on the trust policy and the second set of values of the plurality of attributes; and
  transmitting, by the second node, the payload data and the second trustworthiness opinion via the data provisioning layer toward the recipient.

10. The one or more non-transitory computer-readable media of claim 9, computing the second trustworthiness opinion being further based on the first trustworthiness opinion.

11. The one or more non-transitory computer-readable media of claim 9, the operations further comprising:
  transforming, by the first node, the payload data before transmitting the payload data toward the recipient.

12. The one or more non-transitory computer-readable media of claim 9, the payload data originating from a sensor, and generating the first trustworthiness opinion comprising analyzing a time series of the payload data to determine heuristically whether the payload data originating from the sensor is practically reasonable.

13. The one or more non-transitory computer-readable media of claim 9, the first trustworthiness opinion comprising at least a belief metric, a disbelief metric, and an uncertainty metric.

14. The one or more non-transitory computer-readable media of claim 9, the trust policy comprising a plurality of weights indicating relative importance of respective attributes in the plurality of attributes.

15. The one or more non-transitory computer-readable media of claim 9, the plurality of attributes used to determine trustworthiness of payloads comprising one or more of a source node identifier, a redaction flag indicating whether the payload data has been redacted, or a translation flag indicating whether the payload data has been translated from one format to another format.

16. The one or more non-transitory computer-readable media of claim 9, the plurality of attributes used to determine trustworthiness of payloads comprising at least one attribute that is directly observable by the first node and at least one attribute that is referred by another node in the data provisioning layer.

* * * * *